United States Patent
Tamura et al.

(10) Patent No.: US 12,321,531 B2
(45) Date of Patent: Jun. 3, 2025

(54) KEYBOARD ASSEMBLY AND ELECTRONIC DEVICE

(71) Applicant: HUAWEI TECHNOLOGIES CO., LTD., Guangdong (CN)

(72) Inventors: Fumio Tamura, Yokohama (JP); Yake Zou, Dongguan (CN); Kenji Nagai, Yokohama (JP); Song Wang, Wuhan (CN); Hui Lin, Yokohama (JP); Lingfeng Zeng, Shenzhen (CN); Shaoyong Yang, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/583,811

(22) Filed: Feb. 21, 2024

(65) Prior Publication Data
US 2024/0192786 A1    Jun. 13, 2024

Related U.S. Application Data

(63) Continuation of application No. PCT/CN2022/121548, filed on Sep. 27, 2022.

(51) Int. Cl.
*G06F 3/02* (2006.01)

(52) U.S. Cl.
CPC .................... *G06F 3/021* (2013.01)

(58) Field of Classification Search
CPC ........ G06F 1/1664; G06F 1/1666; G06F 3/02; G06F 3/021; G06F 3/0216; G06F 3/0221
See application file for complete search history.

(56) References Cited

U.S. PATENT DOCUMENTS

| | | | | |
|---|---|---|---|---|
| 7,034,718 | B2* | 4/2006 | Hsu | H01H 3/125 341/26 |
| 2012/0057288 | A1* | 3/2012 | Chou | G06F 1/1628 361/679.09 |
| 2013/0154940 | A1* | 6/2013 | Gan | H01H 36/0073 335/207 |
| 2014/0168875 | A1* | 6/2014 | Nakamura | G06F 1/1666 361/679.09 |
| 2016/0161987 | A1 | 6/2016 | Jacobs | |
| 2016/0259370 | A1 | 9/2016 | Ho et al. | |

(Continued)

FOREIGN PATENT DOCUMENTS

| | | |
|---|---|---|
| CN | 107678559 A | 2/2018 |
| CN | 107765879 A | 3/2018 |

(Continued)

*Primary Examiner* — Hong Zhou

(57) ABSTRACT

A keyboard assembly includes a keyboard body and a drive mechanism. The keyboard body includes a frame assembly and keys. The keys are arranged in a plurality of rows in parallel, each row of keys include a plurality of keys, and the keys are located in key slots on the keyboard body. The frame assembly includes a first frame and a crossbar, and the drive mechanism drives the first frame to move in an arrangement direction of the plurality of rows of keys. One crossbar is correspondingly disposed for each row of keys, the crossbar moves, along with movement of the first frame, in an arrangement direction of each row of keys, and the keys move, along with movement of the crossbar, in a direction toward the key slots or in a direction of exposing the key slots.

19 Claims, 16 Drawing Sheets

(56) References Cited

U.S. PATENT DOCUMENTS

| | | | |
|---|---|---|---|
| 2016/0266657 A1 | 9/2016 | Li | |
| 2016/0334835 A1* | 11/2016 | Tamura | G06F 1/1616 |
| 2019/0377389 A1* | 12/2019 | Tamura | G06F 1/1662 |
| 2020/0192436 A1* | 6/2020 | Shibayama | G06F 1/169 |
| 2020/0211796 A1 | 7/2020 | Li | |

FOREIGN PATENT DOCUMENTS

| | | |
|---|---|---|
| CN | 108346542 A | 7/2018 |
| CN | 111324180 A | 6/2020 |
| JP | 2015097250 A | 5/2015 |
| JP | 2018013974 A | 1/2018 |

* cited by examiner

KEYBOARD ASSEMBLY AND ELECTRONIC DEVICE

CROSS-REFERENCE TO RELATED APPLICATIONS

This application is a continuation of International Application No. PCT/CN2022/121548, filed on Sep. 27, 2022, which claims priority to Chinese Patent Application No. 202111165406.1, filed on Sep. 30, 2021. The disclosures of the aforementioned applications are hereby incorporated by reference in their entireties.

TECHNICAL FIELD

This application relates to the field of electronic device technologies, and in particular, to a keyboard assembly and an electronic device.

BACKGROUND

As people's daily life becomes more enriched, and there are more economic and commercial activities, portable electronic devices with keyboard input such as laptops become one of indispensable terminal products. A keyboard, an important part of each of these portable electronic devices, not only has an exquisite appearance that can bring a good visual experience to consumers, but also provides a key tapping experience that is one of user experience (user experience, UX) that the consumers focus on.

Consumers who use keyboards frequently, especially when the consumers use the portable electronic devices for business, are likely to perform a lot of keyboard input operations throughout the day. Therefore, an experience of tapping on the keyboard becomes increasingly important. As the portable electronic device is developing to be miniaturized and thin, a size of the keyboard becomes smaller, and a thickness of the keyboard becomes thinner. The thickness of the keyboard directly affects a size of a key stroke, which poses a higher challenge to maintain and improve an experience of tapping the key.

Therefore, how to enable the keyboard to provide smooth and comfortable use experience for a user while conforming to a development trend of becoming light, thin, and portable has become an urgent problem to be resolved by a person skilled in the art.

SUMMARY

This application provides a keyboard assembly and an electronic device, so that the keyboard assembly can meet thin, light, and portable design requirements, thereby implementing miniaturized, thin, and light designs of the electronic device, and improving user experience.

According to a first aspect, a keyboard assembly is provided. The keyboard assembly may include a keyboard body and a drive mechanism. The keyboard body includes a frame assembly and keys. In this application, the keys may be disposed in a plurality of rows in parallel, each row of keys include a plurality of keys, and a quantity of keys in each row may be the same or may be different. This is not specifically limited in this application. Key slots may be disposed on the keyboard body, and the keys may be accommodated in corresponding key slots. In addition, when the frame assembly is disposed, the frame assembly may include a first frame and a plurality of crossbars. One crossbar is correspondingly disposed for each row of keys.

When the drive mechanism drives at least a part of the first frame to move in an arrangement direction of the plurality of rows of keys, each crossbar may move, along with movement of at least the part of the first frame in the arrangement direction of the plurality of rows of keys, in an arrangement direction of each row of keys. In addition, each row of keys may move, along with movement of each crossbar, in a direction toward the key slots or in a direction of exposing the key slots. Based on this, when the keyboard assembly is in a use state, a key may move to a set stroke in a direction of exposing a key slot, to meet a use requirement of a user for input through tapping. In addition, when the keyboard assembly is not used, the key may move in a direction toward the key slot. In this way, a part that is of the key and that is exposed to the key slot is small, and a size of the entire keyboard assembly in a thickness direction is small. This facilitates implementation of a thin design of the keyboard assembly.

In a possible implementation of this application, when the first frame is disposed, the first frame may include a first inner frame and a first outer frame. The first outer frame is connected to the drive mechanism, and the first inner frame is located on a side that is of the first outer frame and that faces the key. The first outer frame and the first inner frame may be linked. During specific implementation, a first connecting rod assembly is disposed between the first inner frame and the first outer frame. The first connecting rod assembly includes a first connecting rod and a second connecting rod, one end of the first connecting rod is hinged to the first inner frame, and the other end of the first connecting rod is hinged to the first outer frame. One end of the second connecting rod is hinged to a rod body of the first connecting rod, and the other end of the second connecting rod is hinged to a fixed mechanical part on the keyboard body. In this way, when the first outer frame moves, along with the drive mechanism, in the arrangement direction of the plurality of rows of keys, the first inner frame may be driven to move in a direction close to or away from the first outer frame. In addition, one end of each crossbar may be fixedly connected to the first inner frame, so that when the first inner frame moves, each crossbar may move, along with the first inner frame, in the arrangement direction of each row of keys.

The frame assembly may further include a second frame, the first frame and the second frame may be disposed opposite to each other, and the drive mechanism may further drive the second frame to move in the arrangement direction of the plurality of rows of keys. The foregoing plurality of rows of keys may be located between the first frame and the second frame, and each row of keys may be arranged in a direction from the first frame to the second frame. Similarly, when the second frame is disposed, the second frame may include a second inner frame and a second outer frame. The second outer frame is connected to the drive mechanism, and the second inner frame is located on a side that is of the second outer frame and that faces the key. The second outer frame and the second inner frame may be linked. During specific implementation, a second connecting rod assembly is disposed between the second inner frame and the second outer frame. The second connecting rod assembly includes a third connecting rod and a fourth connecting rod, one end of the third connecting rod is hinged to the second inner frame, and the other end of the third connecting rod is hinged to the second outer frame. One end of the fourth connecting rod is hinged to a rod body of the third connecting rod, and the other end of the fourth connecting rod is hinged to a fixed mechanical part on the keyboard body. In this way, when the second outer frame moves, along with the drive mechanism, in the arrangement direction of the plurality of rows of keys, the second inner frame may be driven to move in a direction close to or away from the first outer frame.

In this application, in a process in which the first outer frame and the second outer frame move, along with the drive mechanism, in the arrangement direction of the plurality of rows of keys, the first inner frame and the second inner frame may be driven to move in a direction that is the same as the arrangement direction of each row of keys. In this way, one end of the crossbar may be fixedly connected to the first inner frame, and the other end of the crossbar may be fixedly connected to the second inner frame, so that the crossbar can move in the arrangement direction of each row of keys. In addition, simultaneous movement of the first inner frame and the second inner frame drives the crossbar to move in the arrangement direction of each row of keys. This can effectively improve stability of movement of the crossbar.

In addition to disposing the frame assembly in this application in the foregoing manner, in another possible implementation of this application, the first frame is provided with a first guide trough, the crossbar is provided with a first pin head, and the first pin head may be inserted into the first guide trough. In a process in which the first frame moves in the arrangement direction of the plurality of rows of keys, the first pin head may be driven to slide along the first guide trough, to drive the crossbar to move in the arrangement direction of each row of keys.

A movement track of the first pin head along the first guide trough is the key to enable movement of the first frame to drive the crossbar to move in the arrangement direction of each row of keys. In a possible implementation of this application, a movement track of the first pin head along the first guide trough may be fitted based on a force status in a process in which the key moves in the direction toward the key slot. During specific implementation, the movement track of the first pin head along the first guide trough may be divided into a first track segment and a second track segment that are continuous, where an included angle between the first track segment and an extension direction of the crossbar is smaller than an included angle between the second track segment and the extension direction of the crossbar. In this way, when the first pin head moves along the first track segment and the second track segment, a movement speed of a key cap in the first track segment is accelerated, and a movement speed of the key cap in the second track segment is slowed down, so that supporting force acting on the key cap is closer. Therefore, force received by the key in an entire process of being pressed is more uniform.

In addition, when the frame assembly further includes the second frame, the first frame and the second frame may be disposed opposite to each other, and the drive mechanism may further drive the second frame to move in the arrangement direction of the plurality of rows of keys. The foregoing plurality of rows of keys may be located between the first frame and the second frame, and each row of keys may be arranged in a direction from the first frame to the second frame. Similarly, when the second frame is disposed, the second frame may be provided with a second guide trough, the crossbar may be provided with a second pin head, and the second pin head may be inserted into the second guide trough. In a process in which the second frame moves in the arrangement direction of the plurality of rows of keys, the second pin head may be driven to slide along the second guide trough, to drive the crossbar to move in the arrangement direction of each row of keys. In addition, simultaneous movement of the first frame and the second frame drives the crossbar to move in the arrangement direction of each row of keys. This can effectively improve stability of movement of the crossbar.

Similar to an arrangement manner of the first guide trough, when the second guide trough is disposed, a movement track of the second pin head along the second guide trough may be divided into a third track segment and a fourth track segment that are continuous, where an included angle between the third track segment and the extension direction of the crossbar is smaller than an included angle between the fourth track segment and the extension direction of the crossbar. In this way, when the second pin head moves along the third track segment and the fourth track segment, a movement speed of a key cap in the third track segment is accelerated, and a movement speed of the key cap in the fourth track segment is slowed down, so that supporting force acting on the key cap is closer. Therefore, force received by the key in an entire process of being pressed is more uniform.

In a possible implementation of this application, the keyboard assembly may further include a rotating shaft mechanism, and the rotating shaft mechanism may be used as a reading mechanism. In addition, the keyboard body may further include a rotating shaft connecting piece, the rotating shaft connecting piece is connected to the rotating shaft mechanism, and the rotating shaft connecting piece may move along with movement of the rotating shaft mechanism. Specifically, when the rotating shaft mechanism moves, the rotating shaft connecting piece may be driven to move in a direction toward or away from the rotating shaft mechanism. In addition, the first frame may move, along with the rotating shaft connecting piece, in the direction toward or away from the rotating shaft mechanism, to drive the crossbar to move in the arrangement direction of each row of keys.

In a possible implementation of this application, to enable the rotating shaft mechanism to drive the rotating shaft connecting piece to move, when the rotating shaft mechanism is disposed, the rotating shaft mechanism may include a rotating assembly, the rotating assembly may include a main shaft and a connecting rod, and the connecting rod slides, along with rotation of the main shaft, in a direction close to or away from the keyboard body. In this way, the rotating shaft connecting piece may be fixedly connected to the connecting rod, so that the connecting rod drives the rotating shaft connecting piece to slide in the direction close to or away from the keyboard body.

In this application, to implement sliding of the connecting rod, the rotating assembly may further include a fastening piece, the main shaft is rotatably connected to the fastening piece, and the connecting rod is slidably connected to the fastening piece. In addition, the main shaft is provided with a stopper part, and a track groove is disposed on an end face that is of the stopper part and that faces the connecting rod. Correspondingly, the connecting rod has a connecting part, and the connecting part is inserted into the track groove. In this way, during rotation of the main shaft, the connecting part may be driven to slide in the track groove, to push the connecting rod to slide in the direction close to or away from the keyboard body.

In addition to the foregoing implementation, sliding of the connecting rod may be further implemented in another possible manner. For example, the rotating assembly may further include a pendulum rod structure, and the pendulum rod structure is sleeved on the main shaft. In a radial direction of the main shaft, the pendulum rod structure is fixedly connected to the main shaft, and the pendulum rod structure has a protruding part. In addition, the connecting rod has the connecting part, the connecting part is provided with a track groove, and the track groove is provided with a concave part. In this way, when the pendulum rod structure rotates with the main shaft, the protruding part may be driven to slide along the track groove, and when the protruding part extends into the concave part, the connecting rod may be driven to slide in a chute in the direction close to or away from the keyboard body.

In this application, in addition to using the rotating shaft mechanism as the drive mechanism for moving the frame assembly, in a possible implementation, the drive mechanism may alternatively be an electric drive mechanism, and the electric drive mechanism may be disposed on the keyboard body. Disposing the drive mechanism as the electric drive mechanism may prevent movement of the frame assembly from being affected by disposing of the rotating shaft mechanism, thereby helping simplify a structure of the keyboard assembly. In addition, this also helps enhance a technical sense of a design of the keyboard assembly, and further enhances user experience.

In addition, when the crossbar moves in the arrangement direction of each row of keys, to enable the keys to move, along with movement of the crossbar, in the direction toward the key slots or in the direction of exposing the key slots, in a possible implementation of this application, for a row of keys and a crossbar that are correspondingly disposed, each key may include a key cap and a lifting mechanism. The lifting mechanism may be located in the key slot, the key cap covers the lifting mechanism, and the lifting mechanism may be used to drive the key cap to reciprocate in the direction toward the key slot or in the direction of exposing the key slot. In addition, the crossbar is provided with a first abutting structure, the lifting mechanism is provided with a second abutting structure, and when the crossbar moves in the arrangement direction of the keys, the crossbar can drive the first abutting structure to press the second abutting structure, to press the lifting mechanism toward the key slot. In this case, the key slot is driven by the lifting mechanism to move in the direction toward the key slot. It may be understood that, when pressing force between the first abutting structure and the second abutting structure is canceled, the lifting mechanism may rise in the direction of exposing the key slot, to drive the key cap to move in the direction of exposing the key slot.

In this application, the keyboard body may be provided with a plurality of key slots, and a plurality of first abutting structures may be provided on the crossbar. At least one abutting structure may be accommodated in each key slot. For example, two abutting structures may be accommodated in each key slot, so that stable pressing force can be applied to the lifting mechanism.

Force transmission may be performed between the first abutting structure and the second abutting structure in a surface contact manner, to improve reliability of contact between the first abutting structure and the second abutting structure. For example, the first abutting structure may have a first inclined surface, the second abutting structure may have a second inclined surface, and the first inclined surface and the second inclined surface are disposed opposite to each other. In this way, when the crossbar moves in the arrangement direction of each row of keys, the first inclined surface may contact the second inclined surface, so that the lifting mechanism can move in the direction toward the key slot.

In a possible implementation of this application, the keyboard body may further include a bottom plate and a keyboard cover plate, and the keyboard cover plate covers the bottom plate, to form accommodation space between the bottom plate and the keyboard body. In this implementation, the key slot may be disposed on the keyboard cover plate. When the key moves in the direction of exposing the key slot until a speed of the key is decreased to 0, a height that is of the key and that protrudes from the keyboard cover plate is the largest. In this case, a user may implement an input function of the keyboard assembly by tapping the key. In addition, when the key moves in the direction of exposing the key slot until the speed of the key is decreased to 0, a height that is of the key and that protrudes from the keyboard cover plate is the smallest. In this case, external space that is of the keyboard body and that is occupied by the key is small, so that a thickness of the entire keyboard cover plate is small.

When the keyboard body includes the bottom plate, a chute may be further arranged on the bottom plate, and each crossbar can move along one chute. This can effectively improve stability of movement of the crossbar, and can further improve consistency of movement of each row of keys that are correspondingly disposed for each crossbar.

According to a second aspect, an electronic device is provided. The electronic device may include a display screen and the keyboard assembly in the first aspect. The display screen is rotatably connected to a keyboard body through a rotating shaft mechanism. In this application, the rotating shaft mechanism may be fixedly connected to the keyboard body, and the rotating shaft mechanism may be a part of the keyboard assembly. Alternatively, the rotating shaft mechanism does not belong to the keyboard assembly, but is a structure of the electronic device. The electronic device provided in this application is used, so that when the electronic device is in an unfolded state, a key may move to a set stroke in a direction of exposing a key slot, to meet a use requirement of a user for input through tapping the key. In addition, when the electronic device is closed, the key may move in a direction toward the key slot. In this way, a part that is of the key and that is exposed to the key slot is small, and a size of the entire keyboard assembly in a thickness direction is small. This helps implement a thin design of the keyboard assembly. Therefore, the electronic device can be designed to be thin in a closed state.

The electronic device may be a user terminal including a display screen and a processor, for example, a notebook computer.

According to a third aspect, another electronic device is provided. The electronic device includes a host and the keyboard assembly in the first aspect, and the host may be rotatably connected to a keyboard body through a rotating shaft mechanism. In this application, the rotating shaft mechanism may be fixedly connected to the keyboard body, and the rotating shaft mechanism may be a part of the keyboard assembly. The electronic device provided in this application is used, so that when the electronic device is in an unfolded state, a key may move to a set stroke in a direction of exposing a key slot, to meet a use requirement of a user for input through tapping the key. In addition, when the electronic device is closed, the key may move in a direction toward the key slot. In this way, a part that is of the key and that is exposed to the key slot is small, and a size of the entire keyboard assembly in a thickness direction is small. This helps implement a thin design of the keyboard assembly. Therefore, the electronic device can be designed to be thin in a closed state.

The host may be a user terminal including a display screen and a processor, for example, a tablet computer.

REFERENCE NUMERALS

Figure 1A:
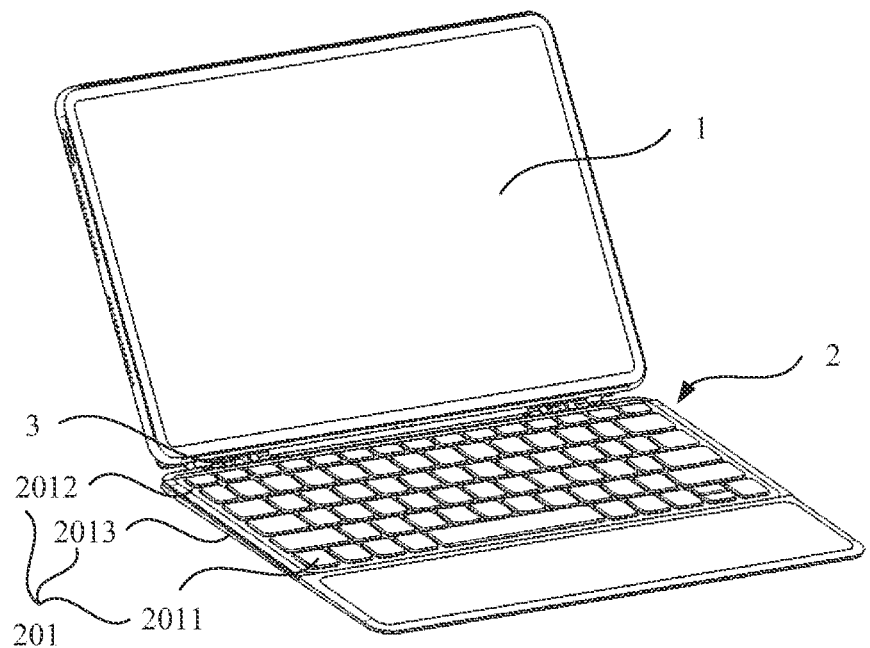
FIG. 1a is a schematic diagram of an application scenario for a keyboard assembly according to an embodiment of this application.

1: display screen;
2: keyboard assembly; 201: keyboard body; 2011: key; 20111: key cap; 20112: lifting mechanism;
201121: second abutting structure; 2011211: second inclined surface; 2012: keyboard cover plate; 20121: key slot;
2013: bottom plate; 2014: rotating shaft connecting piece; 2015: frame assembly; 20151: first frame; 201511: first inner frame;
201512: first outer frame; 201513: first guide trough; 201514: first track segment; 201515: second track segment;
20152: second frame; 201521: second inner frame; 201522: second outer frame; 201523: second guide trough;
20153: crossbar; 201531: first abutting structure; 2015311: first inclined surface; 201532: first pin head;
201533: second pin head;
2016: first connecting rod assembly; 20161: first connecting rod;
201611: first end; 201612: second end; 20162: second connecting rod; 201621: first end;
201622: second end;
2017: second connecting rod assembly;
3: rotating shaft mechanism; 301: rotating assembly; 3011: first fastening piece; 3012: second fastening piece; 30121: guide rail;
301211: first limiting part; 30122: limiting structure; 3013: main shaft; 30131: stopper part; 301311: track groove;
3014: connecting rod; 30141: connecting part; 301411: track groove; 3014111: concave part; 30142: second limiting part;
3015: pendulum rod structure; 30151: protruding part;
4: support part; 401: first support plate; 402: second support plate; 403: third support plate;
5: host; and 6: electric drive mechanism.

DESCRIPTION OF EMBODIMENTS

To make the objectives, technical solutions, and advantages of this application clearer, the following further describes this application in detail with reference to the accompanying drawings.

The following first describes an application scenario for a keyboard assembly provided in this application. The keyboard assembly provided in embodiments of this application may be used in, but is not limited to, a foldable device such as a portable notebook computer, a small keyboard adapted to a mobile phone, or a calculator, or may be used as a keyboard kit of a light office tablet computer, a personal digital assistant (personal digital assistant, PDA), or the like.

Because a keyboard is used as a main input device in application scenarios such as an office and a game, users have increasingly high expectations for various features of the keyboard. To conform to a current development trend of electronic devices, that is, the electronic devices are becoming lighter, thinner, and miniaturized, a thickness of the keyboard becomes smaller. Therefore, strokes of keys on the keyboard become shorter. When a user taps the keyboard, a key usually touches a support structure of the keyboard when the key is pressed to a bottommost end. This brings a feeling of hitting a hard object to the user, and causes finger fatigue after the user uses the keyboard for a long time. Consequently, user experience is affected.

The keyboard assembly provided in this application is used to resolve the foregoing problems. When an input operation is performed through keys, the keys can be risen and exposed on a surface of the keyboard assembly; and when the keyboard assembly is not used, the keys can be lowered and hidden in the keyboard assembly. Therefore, an electronic device in which the keyboard assembly is used can be designed to be thin, and the strokes of the keys can be maintained or even improved when an input operation is performed through the keyboard assembly, to improve user experience. To facilitate understanding of the keyboard assembly provided in this application and the electronic device in which the keyboard assembly is used, the following describes the keyboard assembly in detail with reference to specific embodiments.

It should be noted that terms used in the following embodiments are merely intended to describe specific embodiments, but are not intended to limit this application. Terms "one", "a", "the", "the foregoing", "this", and "the one" of singular forms used in this specification and the appended claims of this application are also intended to include expressions such as "one or more", unless otherwise specified in the context clearly.

Reference to "one embodiment" or "some embodiments" described in this specification means that a specific characteristic, structure or feature described in combination with this embodiment is included in one or more embodiments of this application. Therefore, statements "in an embodiment", "in some embodiments", "in some other embodiments", "in still some other embodiments", and the like that appear at different places of this specification do not necessarily mean referring to a same embodiment. Instead, the statements mean "one or more embodiments but not all of embodiments", unless otherwise specifically emphasized in another manner. Terms "include", "including", "have", and variants thereof all mean "including but not limited to", unless otherwise particularly emphasized.

FIG. 1a is a schematic diagram of an application scenario for a keyboard assembly according to an embodiment of this application. A structure of an electronic device is shown in this embodiment. The electronic device may be a notebook computer, and the electronic device is in an unfolded state in this case. The electronic device includes a display screen 1 and a keyboard assembly 2, and the display screen 1 is rotatably connected to the keyboard assembly 2 through a rotating shaft mechanism 3. It may be understood that in this embodiment, the rotating shaft mechanism 3 may be considered as a part of the keyboard assembly 2; or the rotating shaft mechanism 3 does not belong to the keyboard assembly 2, but is used as an assembly of the electronic device, and both the display screen 1 and the keyboard assembly 2 may be rotatably connected to the rotating shaft mechanism 3.

Generally, the display screen 1 may be configured to implement a display function, and may display content entered through the keyboard assembly 2. The keyboard assembly 2 may include a keyboard body 201, and the keyboard body 201 may be configured to implement an input function of the electronic device. The keyboard body 201 may include a key 2011, a keyboard cover plate 2012, and a bottom plate 2013. The keyboard cover plate 2012 covers the bottom plate 2013, to form accommodation space between the bottom plate 2013 and the keyboard cover plate 2012. A key slot (not shown in FIG. 1a) is disposed on the keyboard cover plate 2012, the key 2011 may be installed in the key slot, and the key 2011 may protrude from a surface of the keyboard cover plate 2012, so that a function of the key 2011 can be implemented by tapping the key 2011. It may be understood that, when the electronic device is closed, the display screen 1 may rotate in a direction toward the key 2011 of the keyboard body 201.

In addition, a control circuit, a battery, some sensors (for example, an infrared sensor, an ultrasonic sensor, and a fingerprint sensor), or the like may be disposed in the keyboard body 201, the control circuit may be disposed to provide a circuit control function for the keyboard body 201, and the sensors may be disposed to provide a function such as signal triggering. In addition, the battery in the keyboard body 201 may be used to maintain a normal working state of the keyboard body 201 when there is no external power supply.

Figure 1B:
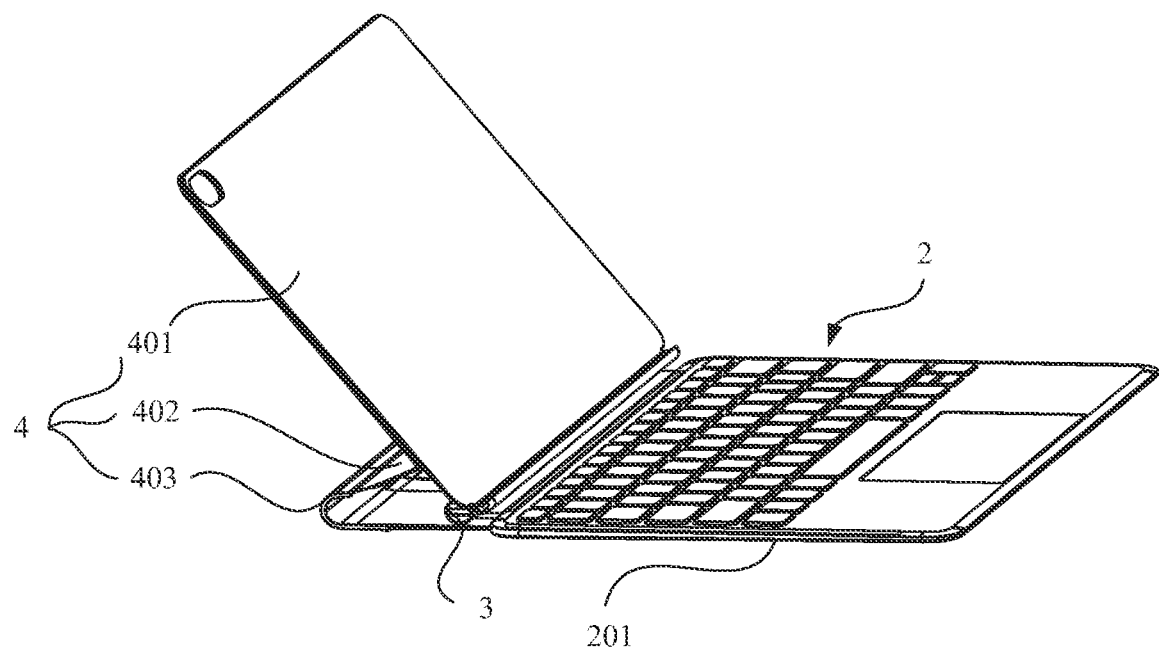
FIG. 1b is a schematic diagram of an application scenario for a keyboard assembly according to another embodiment of this application.

FIG. 1b is a schematic diagram of an application scenario for a keyboard assembly 2 according to another embodiment of this application. In this embodiment, an electronic device may include the keyboard assembly 2, and the keyboard assembly 2 may include a keyboard body 201. In addition, the electronic device may further include a support part 4. The keyboard body 201 may be rotatably connected to the support part 4 through a rotating shaft mechanism 3. It may be understood that, in this embodiment, the rotating shaft mechanism 3 may be fixedly connected to the keyboard body 201, and may be considered as a part of the keyboard assembly 2; or the rotating shaft mechanism 3 does not belong to the keyboard assembly 2, but is used as an assembly of the electronic device, and both the support part 4 and the keyboard body 201 can rotate relative to the rotating shaft mechanism 3.

The support part 4 may be formed by connecting a plurality of support plates. For example, the support part 4 may include a first support plate 401, a second support plate 402, and a third support plate 403. The second support plate 402 is located between the first support plate 401 and the third support plate 403, one end of the second support plate 402 is hinged to a surface that is of the first support plate 401 and that is away from the keyboard assembly 2, and the other end of the second support plate 402 is hinged to the third support plate 403. In addition, the third support plate 403 may slide in a direction toward or away from the keyboard assembly 2.

In the embodiment shown in FIG. 1b, the electronic device is in an unfolded state, and parts that are of the first support plate 401, the second support plate 402, and the third support plate 403 of the support part 4 and that are disposed around the rotating shaft mechanism 3 form a triangular support structure. In processes of unfolding and closing the electronic device, the triangular support structure can form a stable support structure, and can be further used to make a relative rotation process between the support part 4 of the electronic device and the keyboard assembly 2 stable, so that a structure of the electronic device is reliable. It may be understood that, in this embodiment, when the electronic device is closed, the first support plate 401 may rotate in a direction toward a key 2011 of the keyboard assembly 2.

Figure 1C:
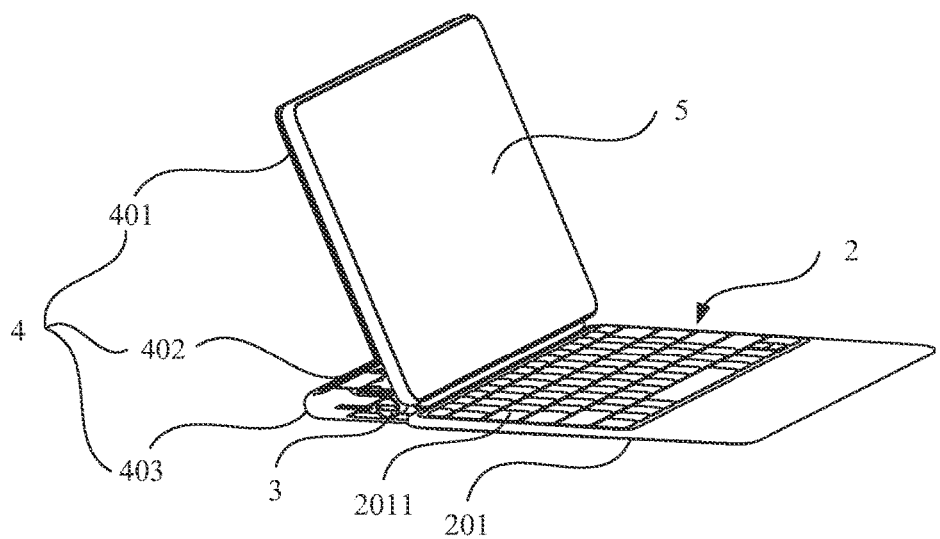
FIG. 1c is a schematic diagram of an application scenario for a keyboard assembly according to another embodiment of this application.

FIG. 1c is a schematic diagram of an application scenario for a keyboard assembly 2 according to another embodiment of this application. In this embodiment, an electronic device may include a host 5 and the keyboard assembly 2. The host 5 is detachably connected to the keyboard assembly 2. In this application, the host 5 is a product with a complete structure and complete functions. After being detached from the keyboard assembly 2, the host 5 can still be used as an independent electronic device for use. For example, the host 5 may be a tablet computer. The host 5 in this application may include but is not limited to a display screen, a battery module, a computing and storage module, and the like. In addition, the host 5 may be further provided with a contact or a connector interface used to match with an external device, for example, a pogo pin (pogo pin), a USB, or a Type-A or Type-C connection interface, to implement a wired connection between the host 5 and the external device. Alternatively, the host 5 may have functional modules such as Bluetooth and Wi-Fi, to implement a wireless connection between the host 5 and the external device. In this application, a type of the host 5 is not specifically limited. The host 5 may be, but is not limited to, the foregoing tablet computer, the PDA, or the like.

In this embodiment, the keyboard assembly 2 may include a keyboard body 201, the electronic device may further include a support part 4, and the keyboard body 201 may be rotatably connected to the support part 4 through a rotating shaft mechanism 3. It may be understood that, in this embodiment, the rotating shaft mechanism 3 may be fixedly connected to the keyboard body 201, and may be considered as a part of the keyboard assembly 2; or the rotating shaft mechanism 3 does not belong to the keyboard assembly 2, but is used as an assembly of the electronic device, and both the support part 4 and the keyboard body 201 can rotate relative to the rotating shaft mechanism 3.

The support part 4 may be formed by connecting a plurality of support plates. For example, the support part 4 may include a first support plate 401, a second support plate 402, and a third support plate 403. The first support plate 401 may be configured to support the host 5. To fasten the host 5 installed on the keyboard assembly 2 to the first support plate 401, in a possible embodiment of this application, a first magnetic element (not shown in FIG. 1c) may be disposed on the first support plate 401, a second magnetic element is disposed at a corresponding location of the host 5, and the first magnetic element and the second magnetic element can adsorb each other. In this application, the first magnetic element may be a magnetic element, or may be an element that is not magnetic but can be adsorbed by a magnetic element; and similarly, the second magnetic element may be a magnetic element, or may be an element that is not magnetic but can be adsorbed by a magnetic element, provided that the first magnetic element and the second magnetic element can be fastened to each other through mutual adsorption. The second support plate 402 is located between the first support plate 401 and the third support plate 403, one end of the second support plate 402 is hinged to a surface that is of the first support plate 401 and that is away from the keyboard body 201, and the other end of the second support plate 402 is hinged to the third support plate 403. In addition, the third support plate 403 may slide in a direction toward or away from the keyboard body 201.

In the embodiment shown in FIG. 1c, the electronic device is in an unfolded state, and parts that are of the first support plate 401, the second support plate 402, and the third support plate 403 of the support part 4 and that are disposed around the rotating shaft mechanism 3 form a triangular support structure. In processes of unfolding and closing the keyboard assembly 2, the triangular support structure can implement stable support for the host 5, and can be further used to make a relative rotation process between the support part 4 of the keyboard assembly 2 and the keyboard body 201 stable, so that a structure of the keyboard assembly 2 is reliable. It may be understood that, in this embodiment, when the electronic device is closed, the host 5 may rotate in a direction toward a key 2011 of the keyboard body 201.

It can be learned from descriptions of the foregoing embodiments that, when the electronic device performs an input operation through the keyboard assembly 2, the key 2011 protrudes from the surface of the keyboard cover plate 2012. However, when the electronic device is in a closed state, if the key 2011 still protrudes from the surface of the keyboard cover plate 2012, a part that is of the key 2011 and that protrudes from the surface of the keyboard cover plate 2012 also occupies space in a thickness direction of the entire electronic device. Based on this, this application provides a solution for enabling the key 2011 to rise or fall, so that when the key 2011 is in a use state, the key 2011 can be risen from a corresponding key slot, and can protrude from the surface of the keyboard cover plate 2012, to facilitate an input operation of a user by tapping the key 2011. In this state, a stroke of the key may be properly designed, to improve user's experience of tapping the key 2011. In addition, when the electronic device is in the closed state, the key 2011 may move in a direction toward the key slot, to reduce a height that is of the key 2011 and that protrudes from the surface of the keyboard cover plate 2012, and the key 2011 may be even completely hidden in the corresponding key slot. In this way, the space that is in the thickness direction of the entire electronic device and that is occupied by the key 2011 can be reduced. Therefore, the electronic device can be designed to be thinner in the closed state.

Figure 2:
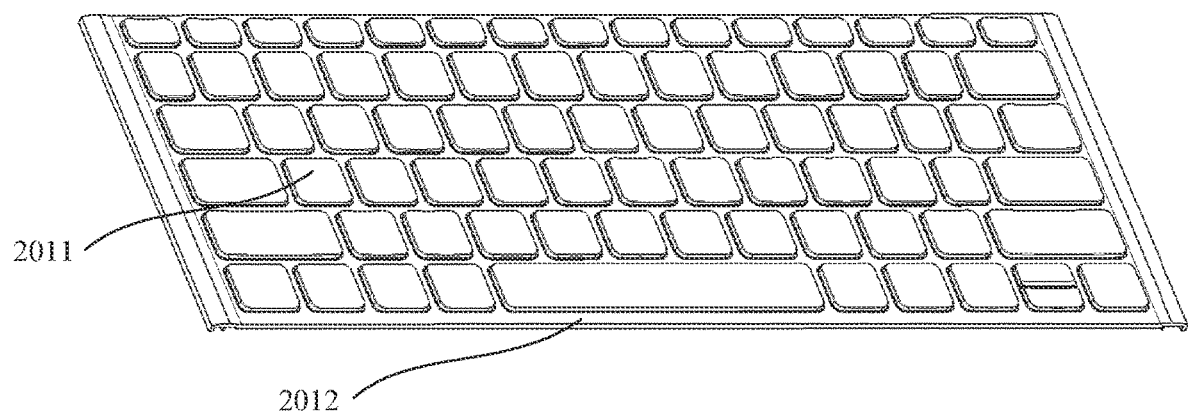
FIG. 2 is a schematic diagram of a partial structure of a keyboard body according to an embodiment of this application.

During specific implementation, refer to FIG. 2. FIG. 2 is a schematic diagram of a partial structure of a keyboard body 201 according to a possible embodiment of this application. It may be seen from FIG. 2 that keys 2011 on the keyboard body 201 may be arranged in a plurality of rows in parallel, and each row of keys 2011 include a plurality of keys 2011. In addition, a quantity of keys 2011 in each row may be the same or may be different.

Figure 3A:
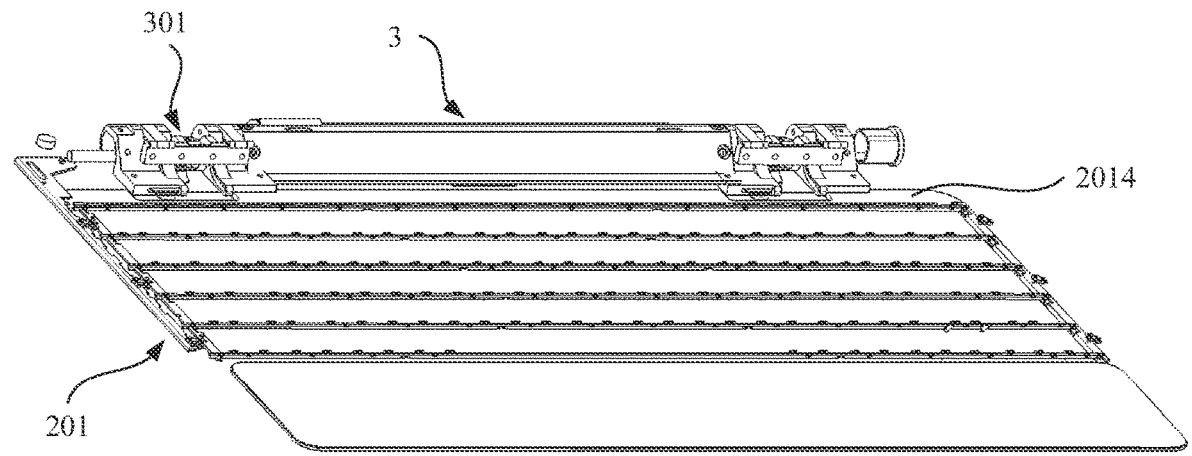
FIG. 3a is a schematic diagram of a structure of a keyboard body according to an embodiment of this application.

FIG. 3a is a schematic diagram of an overall structure of the keyboard body 201 according to this application. In FIG. 3a, structures such as the keys 2011 and the keyboard cover plate 2012 shown in FIG. 2 are omitted, to better show an internal structure of the keyboard body 201. It may be seen from FIG. 3a that a rotating shaft connecting piece 2014 may be disposed at one end of the keyboard body 201, and the rotating shaft connecting piece 2014 may be disposed in but is not limited to a long strip structure. In addition, the rotating shaft connecting piece 2014 may be connected to the rotating shaft mechanism 3, and the rotating shaft connecting piece 2014 may move, along with rotation of the rotating shaft mechanism 3, in a direction toward or away from the rotating shaft mechanism 3.

Figure 3B:
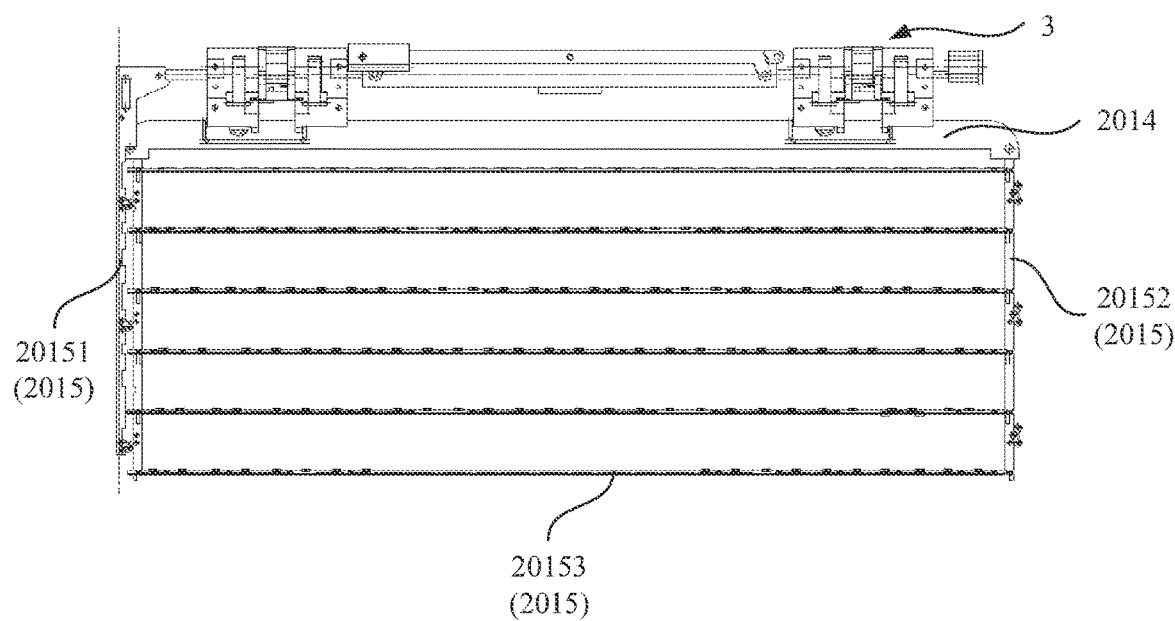
FIG. 3b is a schematic diagram of a structure of a keyboard body according to an embodiment of this application from another angle.

FIG. 3b is a schematic diagram of a structure of the keyboard body 201 shown in FIG. 3a from another angle. The keyboard body 201 may further include a frame assembly 2015, and the frame assembly 2015 includes a first frame 20151, a second frame 20152, and a crossbar 20153. The first frame 20151 and the second frame 20152 are disposed opposite to each other, both the first frame 20151 and the second frame 20152 are fixedly connected to the rotating shaft connecting piece 2014, and a connection manner may be, but is not limited to, a fixed connection by using a fastener such as a screw. In this way, the rotating shaft mechanism 3 may be used as a drive mechanism for moving the frame assembly 2015. When the rotating shaft connecting piece 2014 moves along with the rotating shaft mechanism 3, the first frame 20151 and the second frame 20152 may be driven to move synchronously along with the rotating shaft connecting piece 2014.

Figure 4:
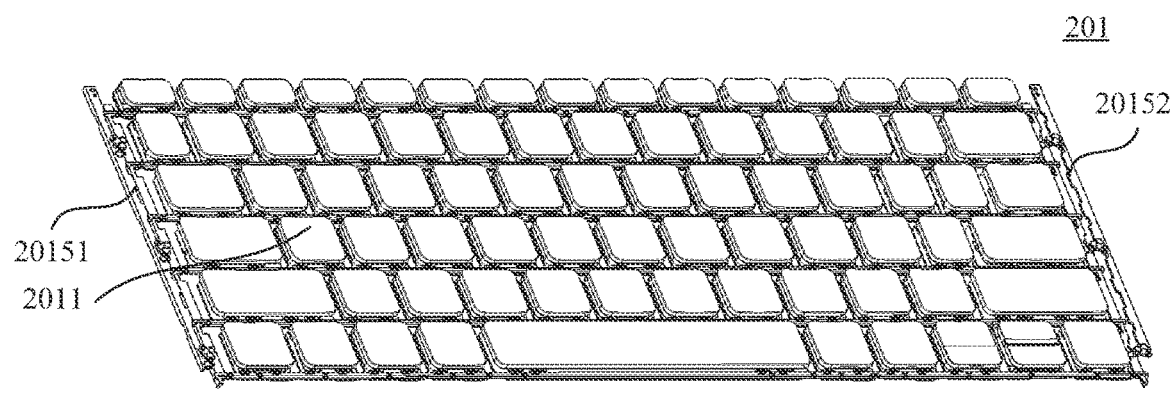
FIG. 4 is a schematic diagram of a partial structure of a keyboard body according to another embodiment of this application.

FIG. 4 is a schematic diagram of a partial structure of the keyboard body 201 after the keyboard cover plate 2012 of the keyboard body 201 in FIG. 2 is removed. It may be seen from FIG. 4 that the plurality of rows of keys 2011 disposed in parallel are located between the first frame 20151 and the second frame 20152, and each row of keys 2011 are arranged in a direction from the first frame 20151 to the second frame 20152.

Figure 5:
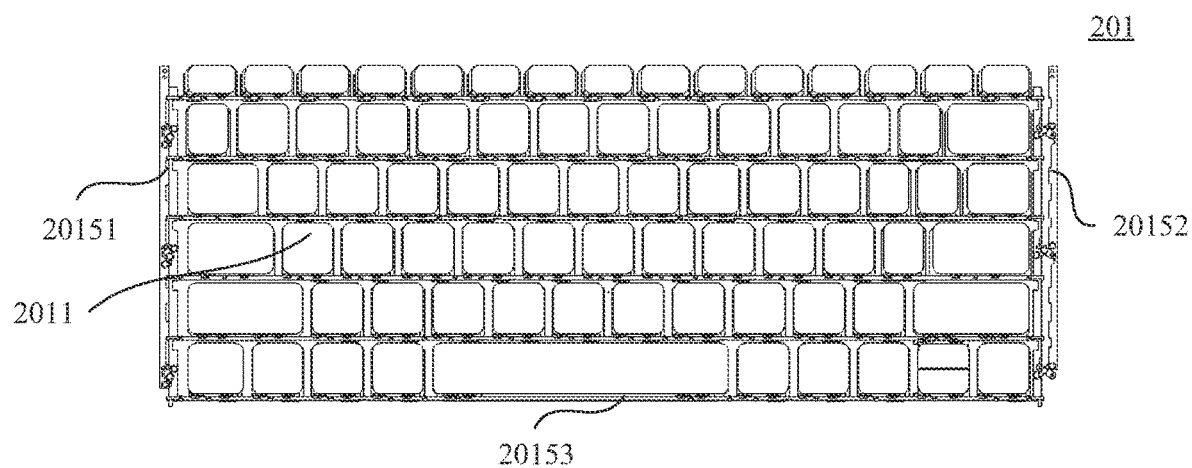
FIG. 5 is a schematic diagram of a structure of the keyboard body shown in FIG. 4 from another angle.

FIG. 5 is a schematic diagram of a structure of the keyboard body 201 shown in FIG. 4 from another angle. In this embodiment, there are a plurality of crossbars 20153, one crossbar 20153 is correspondingly disposed for each row of keys, and a length direction of the crossbar 20153 is the same as an arrangement direction of each row of keys 2011. In addition, the crossbar 20153 may be disposed on a side that is of correspondingly disposed keys 2011 and that faces the rotating shaft mechanism 3 shown in FIG. 3a, or may be disposed on a side that is of the corresponding keys 2011 and that is away from the rotating shaft mechanism 3. This is not specifically limited in this application.

Figure 6:
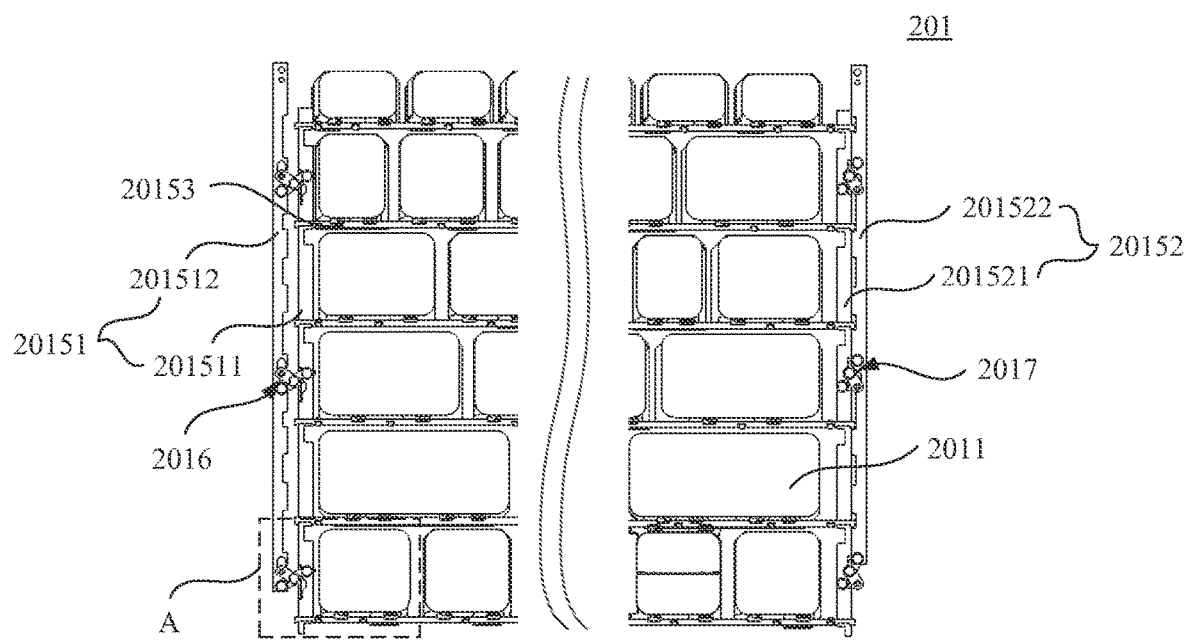
FIG. 6 is an enlarged view of a partial structure of the keyboard body shown in FIG. 5.

In this application, the first frame 20151 and the second frame 20152 may drive the crossbar 20153 to move in the length direction of the crossbar 20153. During specific implementation, refer to FIG. 6. FIG. 6 is an enlarged view of a partial structure of the keyboard body 201 shown in FIG. 5. In this application, the first frame 20151 includes a first inner frame 201511 and a first outer frame 201512, the first inner frame 201511 and the first outer frame 201512 are disposed side by side, and the first inner frame 201511 is located on a side that is of the first outer frame 201512 and that faces the keys 2011. In addition, the first outer frame 201512 is configured to be fixedly connected to the rotating shaft connecting piece 2014 shown in FIG. 3a, the first inner frame 201511 is fixedly connected to the plurality of crossbars 20153, and a connection manner may be, but is not limited to, a fixed connection by using a fastener such as a screw. The first outer frame 201512 may be connected to the first inner frame 201511 through a first connecting rod assembly 2016.

Figure 7:
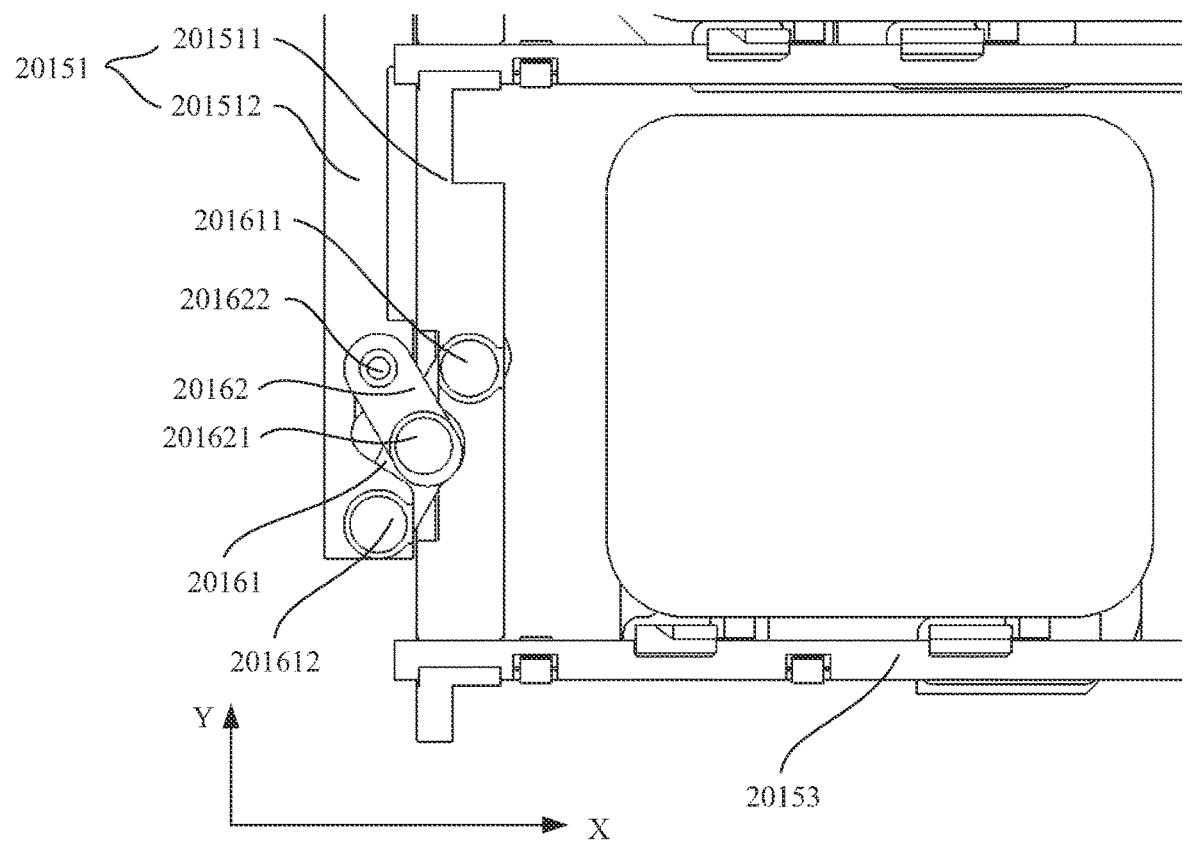
FIG. 7 is an enlarged view of a partial structure at A in FIG. 6.

FIG. 7 is an enlarged view of a partial structure at A in FIG. 6. In this application, the first connecting rod assembly 2016 includes a first connecting rod 20161 and a second connecting rod 20162. A first end 201611 of the first connecting rod 20161 is hinged to the first inner frame 201511, and a second end 201612 of the first connecting rod 20161 is hinged to the first outer frame 201512. The first connecting rod 20161 may be hinged to both the first inner frame 201511 and the first outer frame 201512 by using but is not limited to a pin shaft. A first end 201621 of the second connecting rod 20162 is hinged to a rod body of the first connecting rod 20161, and the rod body of the first connecting rod 20161 is a part that is of the first connecting rod 20161 and that is located between the first end 201611 and the second end 201612. A second end 201622 of the second connecting rod 20162 may be hinged to another mechanical part on the keyboard body 201. It should be noted that the another mechanical part on the keyboard body 201 may be any mechanical part that has a fixed location on the keyboard body 201. In this application, a location-fixed mechanical part is a mechanical part whose location does not change regardless of a working state of the keyboard assembly. For example, the keyboard cover plate 2012 shown in FIG. 2 is a location-fixed structure on the keyboard body 201. Similarly, the second connecting rod 20162 may be hinged to the first connecting rod 20161 and the mechanical part on the keyboard body 201 by using but is not limited to a pin shaft. In addition, in a possible embodiment of this application, the second end 201622 of the second connecting rod 20162 may be located on a side that is of the first end 201621 and that is away from the first inner frame 201511.

Still refer to FIG. 6. In this application, the second frame 20152 may include a second inner frame 201521 and a second outer frame 201522, the second inner frame 201521 and the second outer frame 201522 are disposed side by side, and the second inner frame 201521 is located on a side that is of the second outer frame 201522 and that faces the keys. In addition, the second outer frame 201522 is configured to be fixedly connected to the rotating shaft connecting piece 2014 shown in FIG. 3a, the second inner frame 201521 is fixedly connected to the plurality of crossbars 20153, and a connection manner may be, but is not limited to, a fixed connection by using a fastener such as a screw. The second outer frame 201522 may be connected to the second inner frame 201521 through a second connecting rod assembly 2017, and the second connecting rod assembly 2017 includes a third connecting rod and a fourth connecting rod. Similar to a first frame 20151 side, in this application, a first end of the third connecting rod is hinged to the second inner frame 201521, and a second end of the third connecting rod is hinged to the second outer frame 201522. The third connecting rod may be hinged to both the second inner frame 201521 and the second outer frame 201522 by using but is not limited to a pin shaft. A first end of the fourth connecting rod is hinged to a rod body of the third connecting rod, and a second end of the fourth connecting rod may be hinged to another mechanical part on the keyboard body 201, for example, may be hinged to the keyboard cover plate 2012. Similarly, the fourth connecting rod may be hinged to the third connecting rod and the mechanical part on the keyboard body 201 by using but is not limited to a pin shaft. In addition, in a possible embodiment of this application, the second end of the fourth connecting rod may be located on a side that is of the first end and that is away from the second inner frame 201521.

Still refer to FIG. 7. In FIG. 7, an XY-axes coordinate system indicates a movement direction of the first frame 20151 and the crossbar 20153. A positive direction of a Y axis points to the rotating shaft mechanism 3 (which is not shown in FIG. 7, and for the rotating shaft mechanism 3, refer to FIG. 3a), a positive direction of an X axis points to the second frame 20152 (which is not shown in FIG. 7, and for the second frame 20152, refer to FIG. 6). In addition, in this application, the positive direction of the X axis may be the same as or opposite to an arrangement direction of each row of keys 2011, and the Y axis may refer to an arrangement direction of a plurality of rows of keys. A process in which the first frame 20151 drives the crossbar 20153 to move is described by using an example in which the electronic device to which the keyboard assembly 2 shown in FIG. 7 is used is in an unfolded state.

When the electronic device rotates from the unfolded state shown in FIG. 7 to a closed state, the rotating shaft mechanism 3 may drive the rotating shaft connecting piece 2014 to move in the positive direction of the Y axis, so that the first outer frame 201512 moves in the positive direction of the Y axis, and the second end 201612 of the first connecting rod 20161 moves in the positive direction of the Y axis accordingly. Because the second end 201622 of the second connecting rod 20162 is located in the positive direction of the Y axis of the second end 201612 of the first connecting rod 20161, that the second end 201612 of the first connecting rod 20161 moves in the positive direction of the Y axis means that the second end 201612 of the first connecting rod 20161 moves in a direction toward the second end 201622 of the second connecting rod 20162. In addition, because the second end 201622 of the second connecting rod 20162 is fixedly connected to a structure of the keyboard body 201, the second end 201622 of the second connecting rod 20162 is always in a fixed position, and the second connecting rod 20162 can rotate only around the second end 201622.

Figure 8:
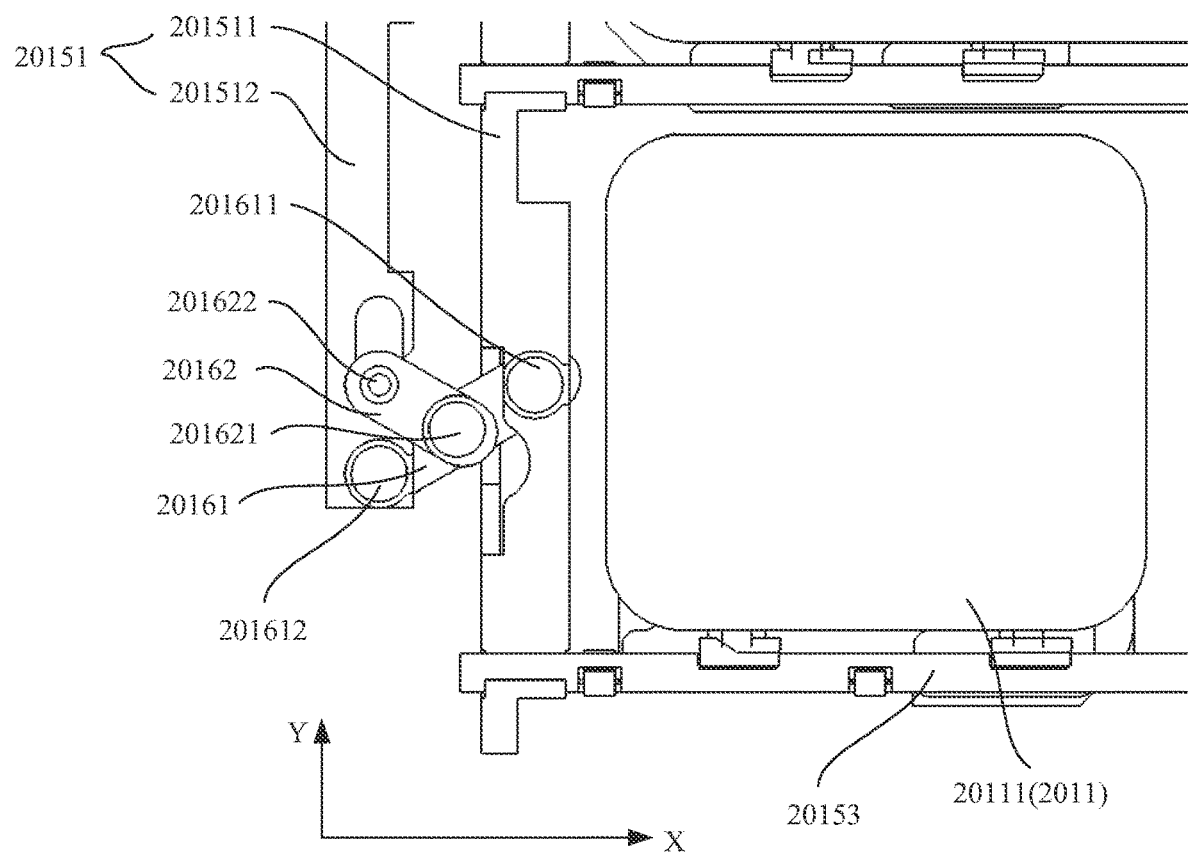
FIG. 8 is a relative location relationship between a first connecting rod and a second connecting rod in a closed state.

FIG. 8 shows a relative location relationship between the first connecting rod 20161 and the second connecting rod 20162 when the electronic device is in a closed state. By comparing FIG. 7 and FIG. 8, it may be learned that, when the keyboard assembly 2 rotates from the unfolded state shown in FIG. 7 to the closed state shown in FIG. 8, an included angle between the first connecting rod 20161 and an X-axis direction and an included angle between the second connecting rod 20162 and the X-axis direction are decreased. In this case, both the first end 201611 of the first connecting rod 20161 and the first end 201621 of the second connecting rod 20162 move in the positive direction of the X axis, to push the first inner frame 201511 to move in the positive direction of the X axis, and each crossbar 20153 is driven by the first inner frame 201511 to move in a direction toward the second frame 20152.

It may be understood that, in the foregoing process, an included angle between the third connecting rod and the X-axis direction and an included angle between the fourth connecting rod and the X-axis direction increase. In this case, both the first end of the third connecting rod and the first end of the fourth connecting rod move in the positive direction of the X-axis, to drive the second inner frame 201521 to move in the positive direction of the X axis, and each crossbar 20153 is driven by the second inner frame 201521 to move in a direction away from the first frame 20151.

In addition, when the electronic device rotates from the closed state shown in FIG. 8 to the unfolded state shown in FIG. 7, each crossbar 20153 is driven by the first inner frame 201511 and the second inner frame 201521 to move in a negative direction of the X axis.

In this application, when the keyboard assembly 2 rotates, the first outer frame 201512 and the second outer frame 201522 may move in a direction toward or away from the rotating shaft mechanism 3, to drive the first inner frame 201511 and the second inner frame 201521 to move in a direction that is the same as an arrangement direction of each row of keys 2011, so that the crossbar 20153 can move, along with the first inner frame 201511 and the second inner frame 201521, back and forth in the arrangement direction of each row of keys 2011. In addition, each crossbar 20153 is correspondingly disposed for a row of keys 2011. Based on this, to lift or lower the keys 2011 when the electronic device in which the keyboard assembly 2 is used is in different folding states, a pressing mechanism may be arranged between the crossbar 20153 and corresponding keys 2011, so that the keys 2011 are pressed and pushed by back-and-forth movement of the crossbar 20153, to lift and lower the keys 2011.

Figure 9:
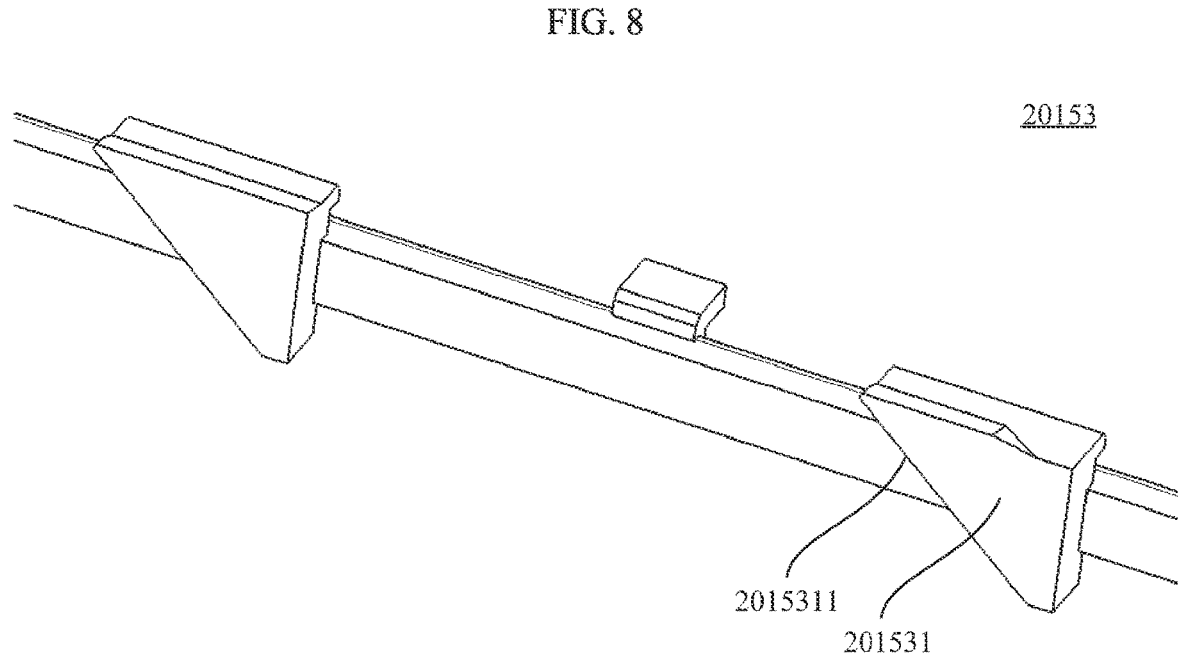
FIG. 9 is an enlarged view of a partial structure of a crossbar according to an embodiment of this application.

During specific implementation, refer to FIG. 9. FIG. 9 is an enlarged view of a partial structure of a crossbar 20153 according to a possible embodiment of this application. The crossbar 20153 may be provided with a first abutting structure 201531. There may be a plurality of first abutting structures 201531, and the first abutting structure 201531 may be disposed based on a quantity of keys 2011 correspondingly disposed for the crossbar 20153. In this embodiment of this application, the first abutting structure 201531 may be provided with a first inclined surface 2015311. In addition, tilt angles of first inclined surfaces 2015311 of the plurality of first abutting structures 201531 may be the same or different.

Figure 10:
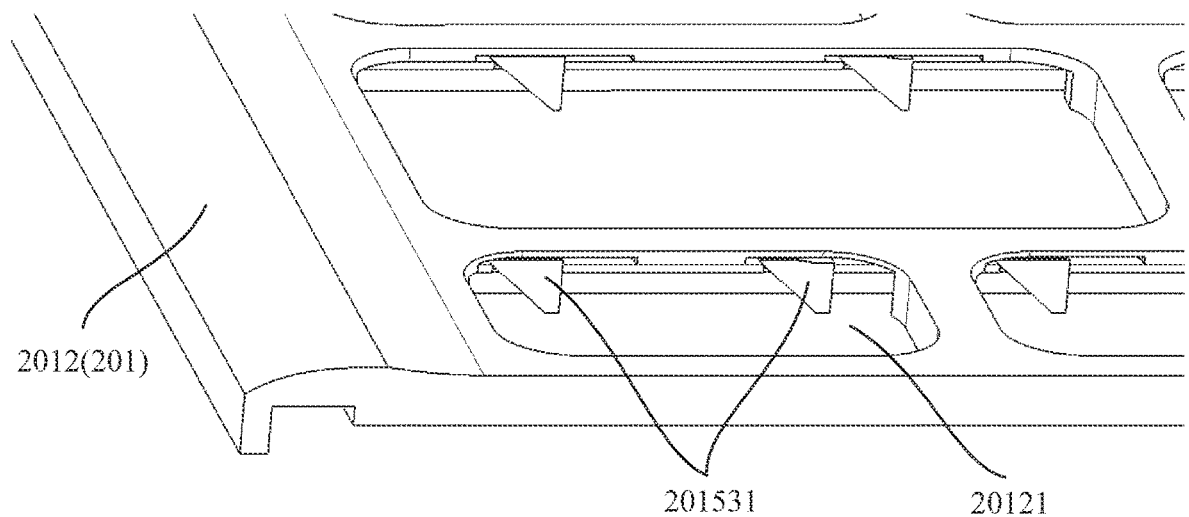
FIG. 10 is a schematic diagram of a structure in which a crossbar is mounted on a keyboard body according to an embodiment of this application.

In addition, refer to FIG. 10. FIG. 10 shows a schematic diagram of a structure in which the crossbar 20153 shown in FIG. 9 is mounted on the keyboard body 201. The keyboard body 201 has a plurality of key slots 20121, and correspondingly, each key slot 20121 may accommodate at least one first abutting structure 201531. For example, as shown in FIG. 10, each key slot 20121 may accommodate two first abutting structures 201531.

Figure 11:
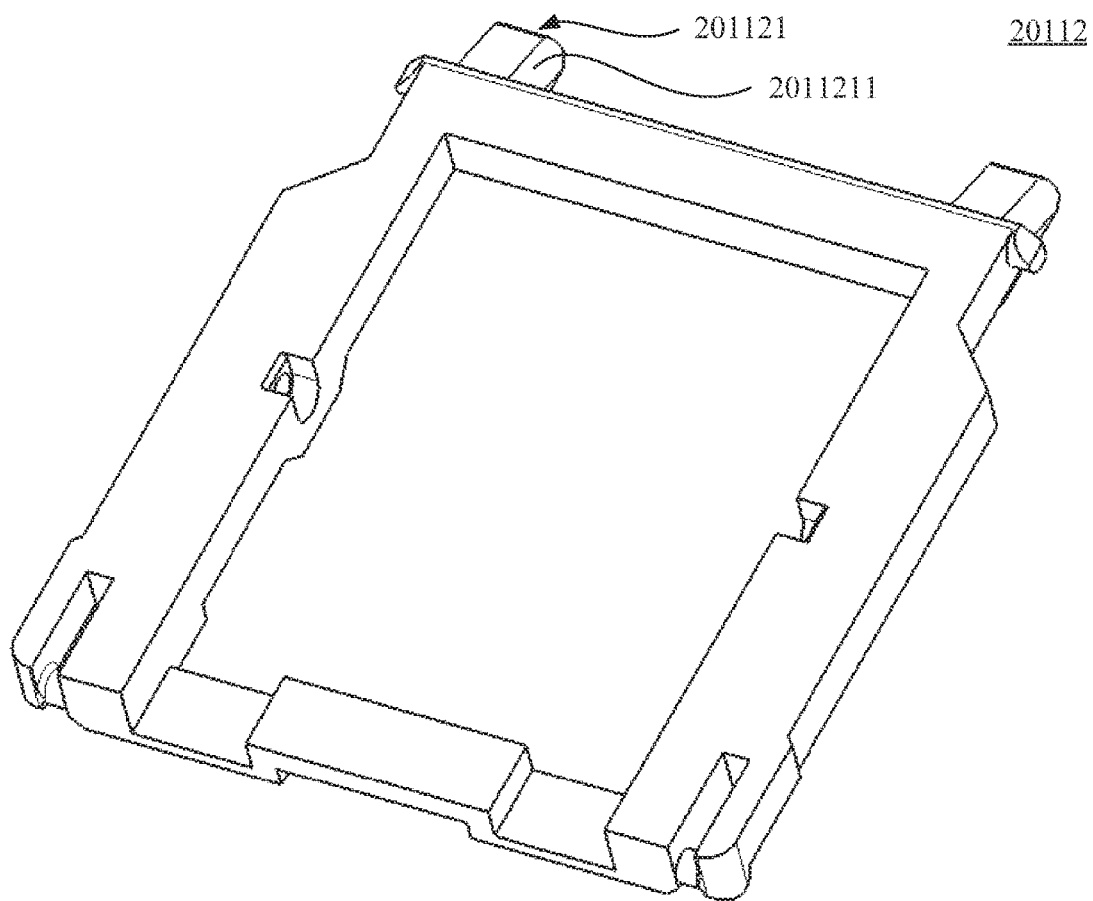
FIG. 11 is a schematic diagram of a structure of a lifting mechanism according to an embodiment of this application.

In this application, the key 2011 may include a key cap 20111 shown in FIG. 8 and a lifting mechanism 20112 shown in FIG. 11. The key cap 20111 may be configured to provide a pressing surface that bears pressing pressure. The lifting mechanism 20112 is disposed between the key cap 20111 and the bottom plate 2013 (referring to FIG. 1*a*), and the key cap 20111 covers and is fastened to the lifting mechanism 20112, to protect the lifting mechanism 20112. When no force is applied to the key 2011, a distance between the key cap 20111 and the bottom plate 2013 is the largest. When the key 2011 moves toward the bottom plate 2013, and a speed of the key 2011 is decreased to zero, a distance between the key cap 20111 and the bottom plate 2013 is the smallest. In addition, when the distance between the key cap 20111 and the bottom plate 2013 is the largest, the lifting mechanism 20112 is in an unfolded state; and when the distance between the key cap 20111 and the bottom plate 2013 is the smallest, the lifting mechanism 20112 is in a folded state. In this embodiment of this application, the lifting mechanism 20112 may be used to drive the key cap 20111 to reciprocate in a direction toward the key slot 20121 or in a direction of exposing the key slot 20121. It may be understood that, in one aspect, the lifting mechanism 20112 may provide driving force that enables the key cap 20111 to move in the direction of exposing the key slot 20121, and in another aspect, the lifting mechanism 20112 may further provide supporting force for the key cap 20111 when the distance between the key cap 20111 and the bottom plate 2013 is the largest.

In this application, a specific structural form of the lifting mechanism 20112 is not limited. For example, the lifting mechanism 20112 may be in a scissor-switch type shown in FIG. 11, or may be in another possible structural form such as a butterfly type. The lifting mechanism 20112 may be accommodated in a key slot 20121 shown in FIG. 10, the lifting mechanism 20112 is provided with a second abutting structure 201121, and the second abutting structure 201121 may be provided with a second inclined surface 2011211. In addition, each lifting mechanism 20112 may have a plurality of second abutting structures 201121. For example, as shown in FIG. 11, each lifting mechanism 20112 may be provided with two second abutting structures 201121. When each lifting mechanism 20112 has the plurality of second abutting structures 201121, inclination directions of second inclined surfaces 2011211 of the plurality of second abutting structures 201121 may be the same or different.

Figure 12:
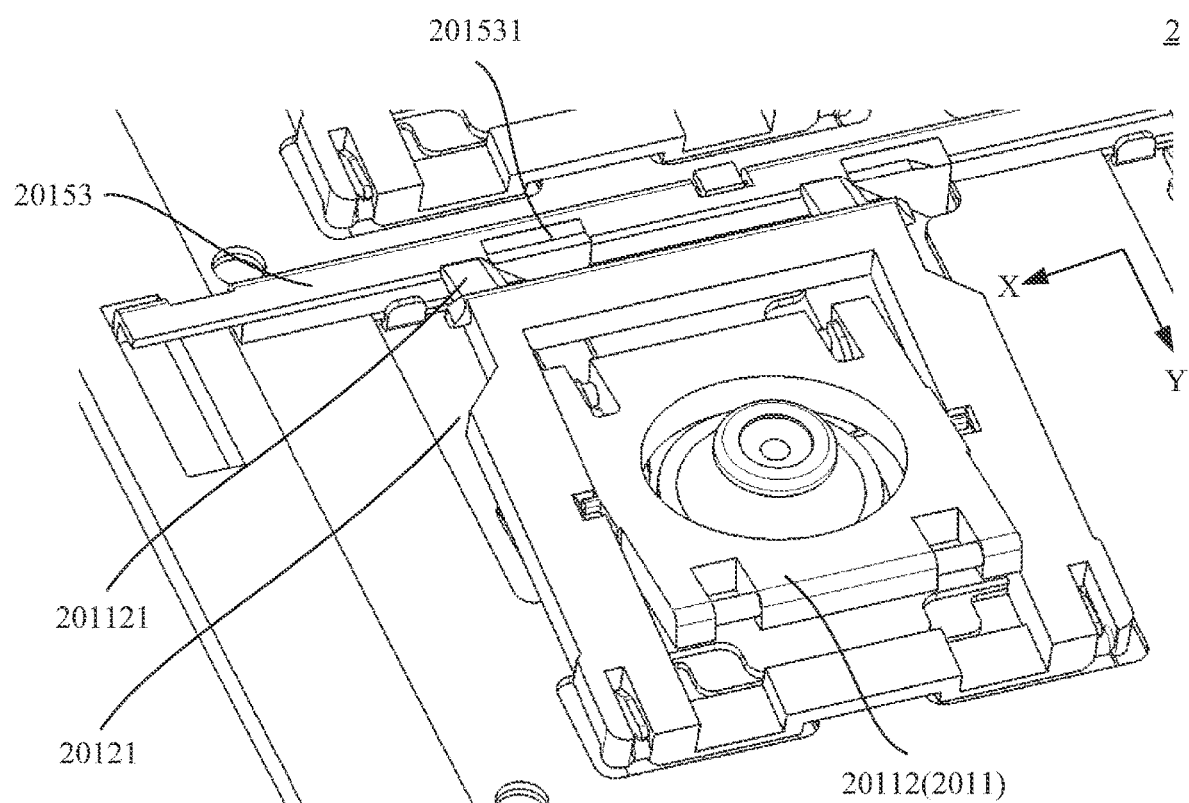
FIG. 12 shows a cooperation relationship between a crossbar and a key according to an embodiment of this application.

FIG. 12 shows a cooperation relationship between a crossbar 20153 and a key 2011 when an electronic device in which a keyboard assembly 2 is used is in an unfolded state according to an embodiment of this application. In the embodiment shown in FIG. 12, a key cap 20111 is omitted to facilitate description of cooperation between the crossbar 20153 and the key 2011. In addition, a view angle of the keyboard assembly 2 in FIG. 12 is adjusted compared with that in FIG. 7, but directions of a Y axis and an X axis are the same in FIG. 12 and FIG. 17.

As shown in FIG. 12, in this application, for the crossbar 20153 and keys 2011 that are correspondingly disposed, the first inclined surface 2015311 of the first abutting structure 201531 that is of the crossbar 20153 shown in FIG. 9 and that is in a key slot 20121 may be disposed opposite to the second inclined surface 2011211 of the second abutting structure 201121 that is of the lifting mechanism 20112 shown in FIG. 11 and that is in the same key slot 20121, and the second inclined surface 2011211 is located in a positive direction of the X axis relative to the first inclined surface 2015311. In addition, in the state shown in FIG. 12, the first inclined surface 2015311 and the oppositely disposed second inclined surface 2011211 may be disposed at an interval; or the first inclined surface 2015311 and the second inclined surface 2011211 are in contact with each other, but there is no pressing force between the first inclined surface 2015311 and the second inclined surface 2011211, or pressing force between the first inclined surface 2015311 and the second inclined surface 2011211 is small. In this case, the lifting mechanism 20112 is in a raised state, and the entire key 2011 may protrude from the surface of the keyboard cover plate 2012 shown in FIG. 2, so that an input function of the keyboard assembly 2 is implemented by tapping the key 2011.

Figure 13:
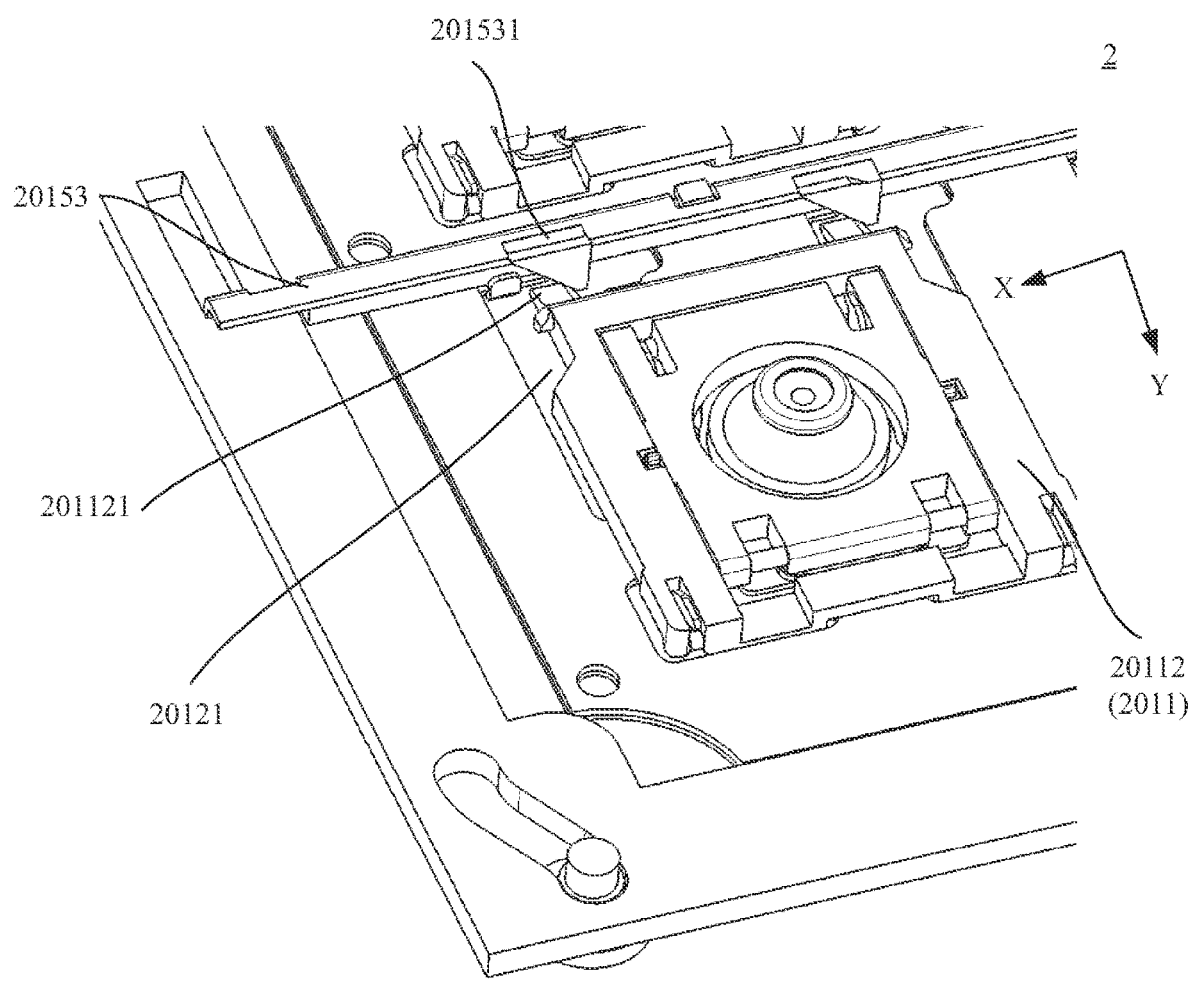
FIG. 13 shows a cooperation relationship between a crossbar and a key according to another embodiment of this application.

It may be learned from the description of the foregoing embodiment that, when the electronic device rotates from the unfolded state shown in FIG. 12 to a closed state, the crossbar 20153 may move in the positive direction of the X axis, and the second inclined surface 2011211 of the second abutting structure 201121 is located in the positive direction of the X axis relative to the first inclined surface 2015311 of the first abutting structure 201531. When the crossbar 20153 moves in the positive direction of the X-axis, the first inclined surface 2015311 exerts pressing force on the second inclined surface 2011211. FIG. 13 shows a cooperation relationship between the crossbar 20153 and the key 2011 when the electronic device is in the closed state. It may be learned from FIG. 13 that, when the electronic device is in the closed state, the lifting mechanism 20112 drives the key cap 20111 to move in a direction toward the key slot 20121 under action of the pressing force exerted by the first inclined surface 2015311 on the second inclined surface 2011211, so that the key 2011 may be lowered into the corresponding key slot 20121. Therefore, a height that is of the key 2011 and that protrudes from the surface of the keyboard cover plate when the electronic device is in the closed state is small, so that a thickness of the keyboard assembly 2 in the closed state of the electronic device is small, to meet a thin design requirement of the electronic device, and improve user experience.

In addition, when the electronic device rotates from the closed state to the unfolded state, the crossbar 20153 moves in a negative direction of the X axis, the pressing force exerted by the first inclined surface 2015311 on the second inclined surface 2011211 becomes smaller. In this case, the lifting mechanism 20112 may drive the key cap 20111 to rise from the corresponding key slot 20121, and the key cap 20111 can protrude from the surface of the keyboard cover plate 2012 shown in FIG. 2, to implement a function of the key 2011.

In the foregoing embodiments of this application, the frame assembly 2015 includes two frames. In this case, cooperative movement of the two frames drives the crossbar 20153 to move, to improve stability of movement of the crossbar 20153. In some other possible embodiments of this application, the frame assembly 2015 may include only one frame, for example, only the first frame. In this case, the one frame moves along with the rotating shaft connecting piece 2014, to drive the crossbar 20153 to move. This simplifies a structure of the frame assembly 2015. It may be understood that, in this embodiment, a movement track may be disposed for the first frame and the crossbar 20153, to ensure stability of movement of the first frame and the crossbar 20153. For example, a plurality of chutes may be disposed on the bottom plate 2013 shown in FIG. 1a, and each crossbar 20153 moves along a corresponding chute.

The keyboard assembly 2 provided in this application is used, so that when the key 2011 is in a use state, the key 2011 may protrude from the surface of the keyboard cover plate 2012, so that a user can perform a tapping operation. In this state, a stroke of the key 2011 may be properly designed to meet a tapping use requirement of the user, and improve user experience. In addition, in this application, the rotating shaft mechanism 3 may drive the rotating shaft connecting piece 2014 to move in a direction toward or away from the rotating shaft mechanism 3, to drive the crossbar 20153 that is correspondingly disposed for each row of keys 2011 to move in an arrangement direction of each row of keys 2011, and mutual pressing force of abutting structures between the crossbar 20153 and the keys 2011 enables the keys 2011 to move in a direction toward corresponding key slots 20121, to reduce a height that is of each of the keys 2011 and that protrudes from the surface of the keyboard cover plate 2012. In addition, the keys 2011 can be even completely hidden in the corresponding key slots 20121. When the keyboard assembly 2 is used in the electronic device, the keys 2011 move in the direction toward the corresponding key slots 20121, to reduce space that is in a thickness direction of the entire electronic device and that is occupied by the keys 2011. Therefore, the electronic device can be designed to be thinner in this state.

Figure 14:
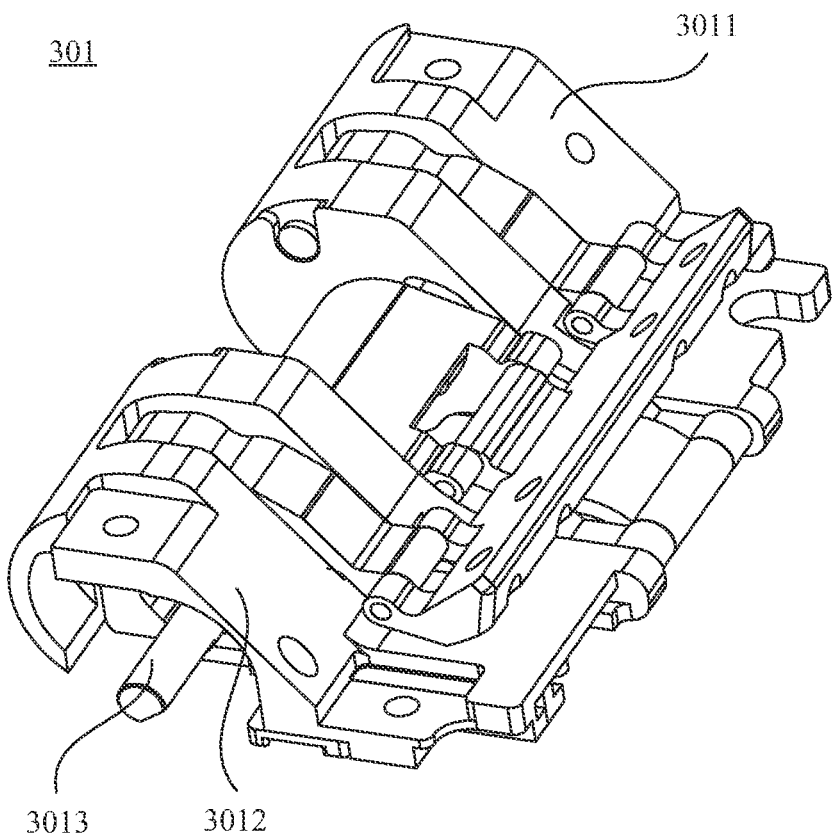
FIG. 14 is a schematic diagram of a structure of a rotating assembly according to an embodiment of this application.

In this application, to drive the rotating shaft connecting piece 2014 to move in the direction toward or away from the rotating shaft mechanism 3 when the rotating shaft mechanism 3 rotates, the rotating shaft connecting piece 2014 may be connected to a rotatable piece of the rotating shaft mechanism 3, so that in a rotation process of the rotatable piece, the rotatable piece can drive the rotating shaft connecting piece 2014 to move. During specific implementation, the rotating shaft mechanism 3 may include a rotating assembly 301. FIG. 14 is a schematic diagram of a structure of the rotating assembly 301 according to a possible embodiment of this application. In this embodiment, the rotating assembly 301 may include a first fastening piece 3011 and a second fastening piece 3012, the first fastening piece 3011 and the second fastening piece 3012 may be fixedly connected to the keyboard body in the foregoing embodiments, and a connection manner may be, but is not limited to, a fixed connection by using a fastener such as a screw. In addition, the first fastening piece 3011 and the second fastening piece 3012 may be used as support pieces of the entire rotating assembly 301, the first fastening piece 3011 and the second fastening piece 3012 are disposed at an interval, and other structures of the rotating assembly 301 may be connected to the first fastening piece 3011 and the second fastening piece 3012 in a direct or indirect manner.

Still refer to FIG. 14. In this application, the rotating assembly 301 may further include a main shaft 3013, and the main shaft 3013 may sequentially pass through the first fastening piece 3011 and the second fastening piece 3012. If the main shaft 3013 is rotatably connected to the first fastening piece 3011 and the second fastening piece 3012, the main shaft 3013 may rotate relative to the first fastening piece 3011 and the second fastening piece 3012.

Figure 15:
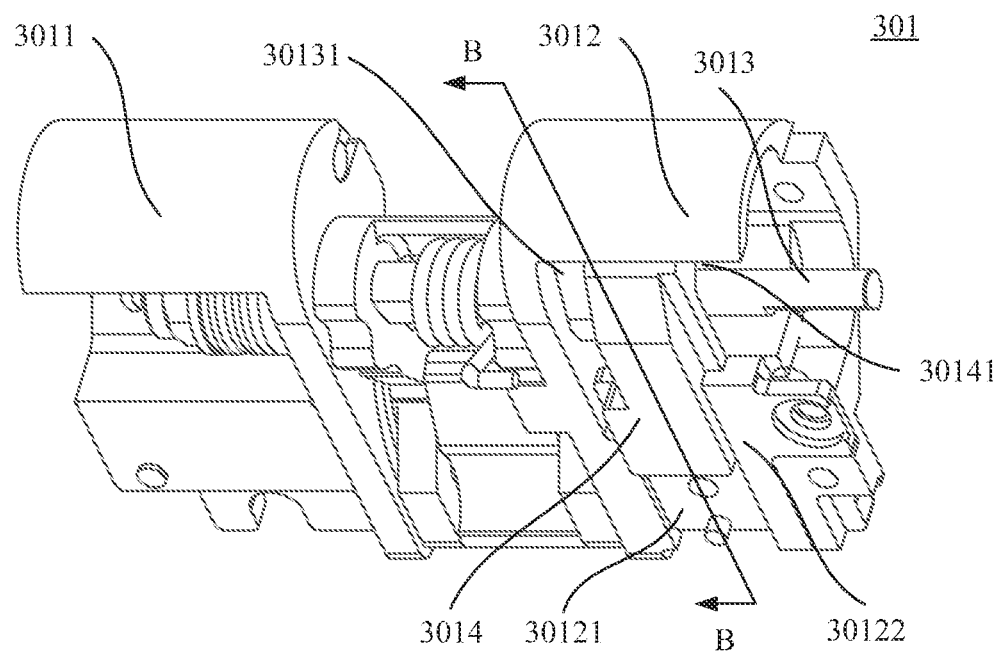
FIG. 15 is a schematic diagram of a structure of the rotating assembly shown in FIG. 14 from another angle.

In addition, refer to FIG. 15. FIG. 15 is a schematic diagram of a structure of the rotating assembly 301 shown in FIG. 14 from another angle. In this embodiment, a stopper part 30131 may be further disposed, on the main shaft 3013, at one end that is of the second fastening piece 3012 and that is away from the first fastening piece 3011, and the stopper part 30131 may be used to implement limiting of the main shaft 3013 in an axial direction, to reduce slipping of the main shaft 3013 in the axial direction, thereby improving stability of movement of the entire rotating assembly 301.

Still refer to FIG. 15. In this application, the rotating assembly 301 may further include a connecting rod 3014, a guide rail 30121 is disposed on the second fastening piece 3012, and the connecting rod 3014 may be accommodated on the guide rail 30121 and may slide along the guide rail 30121. Still refer to FIG. 15. In some embodiments of this application, to prevent the connecting rod 3014 from falling from the guide rail 30121, the rotating assembly 301 may further include a limiting structure 30122, the limiting structure 30122 is fixedly connected to the second fastening piece 3012, and the connecting rod 3014 is limited within the guide rail 30121, thereby improving reliability of movement of the connecting rod 3014.

Figure 16A:
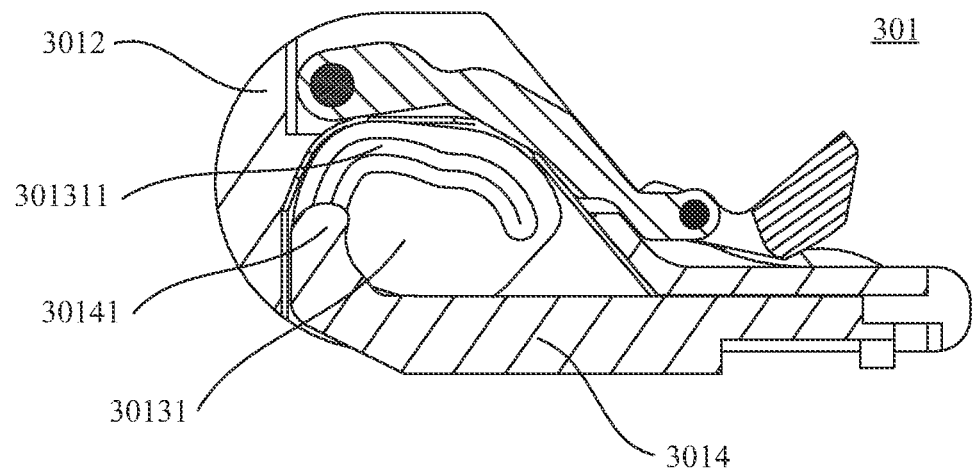
FIG. 16a is a sectional view of FIG. 15 at B-B.

In addition, during movement of the rotating assembly 301, a connecting part 30141 may be provided on a side that is of the connecting rod 3014 and that faces the second fastening piece 3012, so that the connecting rod 3014 can slide in the guide rail 30121. Because other structures of the rotating assembly 301 may rotate along with rotation of the main shaft 3013, in this application, the connecting rod 3014 may be connected to the main shaft 3013 through the connecting part 30141. During specific implementation, refer to FIG. 16*a*. FIG. 16*a* is a sectional view of FIG. 15 at B-B. It may be learned from the description of the foregoing embodiments that the stopper part 30131 is disposed, on the main shaft 3013, on a side that is of the second fastening piece 3012 and that is away from the first fastening piece 3011. Refer to FIG. 16*a*. A track groove 301311 may be disposed on an end face that is of the stopper part 30131 and that faces the connecting rod 3014, and the connecting part 30141 of the connecting rod 3014 may be inserted into the track groove 301311. In this way, during rotation of the main shaft 3013, the connecting part 30141 of the connecting rod 3014 can slide along the track groove 301311.

Figure 16B:
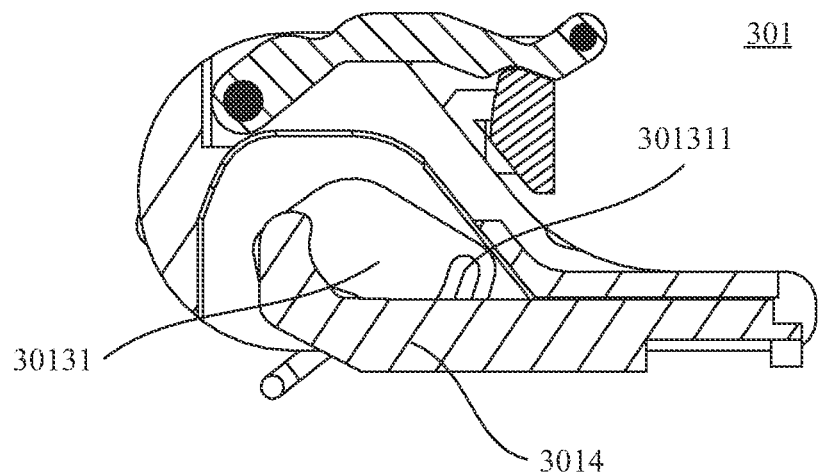
FIG. 16b is a sectional view of a rotating assembly according to an embodiment of this application in another working state.

It may be understood that a movement track of the connecting rod 3014 may be designed by properly designing the track groove 301311. For example, when the rotating assembly 301 is in a state corresponding to FIG. 16*a*, the connecting rod 3014 can be hidden in the second fastening piece 3012. In addition, refer to FIG. 16*b*. FIG. 16*b* shows a relative location relationship between the connecting rod 3014 and the stopper part 30131 when the rotating assembly 301 is in another working state. When the rotating assembly 301 is in a state shown in FIG. 16*b*, the connecting rod 3014 may extend from the second fastening piece 3012. For example, when the rotating assembly 301 is used in the keyboard assembly 2 shown in FIG. 3*a*, and the electronic device in which the keyboard assembly 2 is used changes from an unfolded state to a closed state, the main shaft 3013 rotates in a clockwise direction, and the connecting rod 3014 may slide in a direction toward the keyboard body 201. On the contrary, when the electronic device changes from the closed state to the unfolded state, the main shaft 3013 rotates in a counterclockwise direction, and the connecting rod 3014 may slide in a direction away from the keyboard body 201. In some other embodiments of this application, when the rotating assembly 301 is used in the keyboard assembly, and the electronic device in which the keyboard assembly is used changes from the unfolded state to the closed state, the main shaft 3013 rotates in a clockwise direction, and the connecting rod 3014 may slide in the direction away from the keyboard body 201. On the contrary, when the electronic device changes from the closed state to the unfolded state, the main shaft 3013 rotates in a counterclockwise direction, and the connecting rod 3014 may slide in the direction toward the keyboard body 201.

Refer to FIG. 3*a*. In this application, the rotating shaft mechanism 3 may be disposed at one end of the keyboard body, and the rotating shaft mechanism 3 may extend in a direction from the first frame 20151 to the second frame 20152. In addition, the connecting rod 3014 can slide, along with rotation of the main shaft 3013, in a direction toward or away from the keyboard body 201. Therefore, in this application, the rotating shaft connecting piece 2014 of the keyboard body 201 may be fixedly connected to the connecting rod 3014, so that when the connecting rod 3014 slides, the rotating shaft connecting piece 2014 is driven to move in a direction toward or away from the rotating shaft mechanism 3. In this way, the crossbar 20153 moves in an arrangement direction of each row of keys 2011, and the keys 2011 move in a direction toward or away from corresponding key slots 20121.

It should be noted that, in this application, a plurality of rotating assemblies 301 may be disposed in the rotating shaft mechanism 3, to improve stability of movement of the rotating shaft connecting piece 2014. For example, in the embodiment shown in FIG. 3*a*, two rotating assemblies 301 may be disposed in the rotating shaft mechanism 3, and the two rotating assemblies 301 may be disposed at two ends in extension directions of the rotating shaft mechanism 3. In this way, connecting rods 3014 of the two rotating assemblies 301 may be fixedly connected to the rotating shaft connecting piece 2014, and the two connecting rods 3014 may be properly disposed to move synchronously and in a same direction, to drive the rotating shaft connecting piece 2014 to move. In this way, reliability of movement of the rotating shaft connecting piece 2014 can be improved, and stability of movement of the entire keyboard assembly 2 can be improved.

Figure 17:
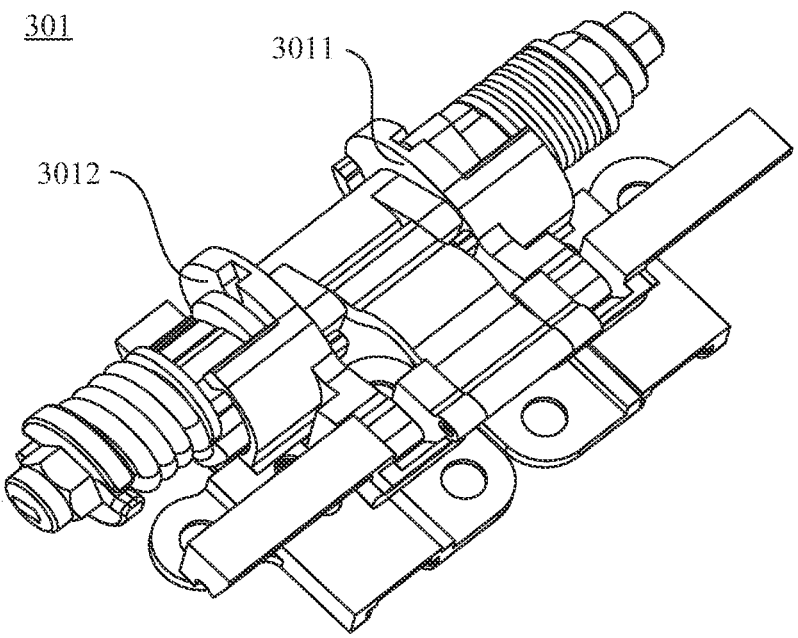
FIG. 17 is a schematic diagram of a structure of a rotating assembly according to another embodiment of this application.

In this application, in addition to the disposing manner provided in the foregoing embodiment, the rotating assembly 301 may be further disposed in a manner shown in FIG. 17. FIG. 17 is a schematic diagram of a structure of the rotating assembly 301 according to another embodiment of this application. In this embodiment, the rotating assembly 301 also includes a first fastening piece 3011, a second fastening piece 3012, and a main shaft 3013, the main shaft 3013 passes through the first fastening piece 3011 and the second fastening piece 3012, and the main shaft 3013 can rotate relative to the first fastening piece 3011 and the second fastening piece 3012.

Figure 18:
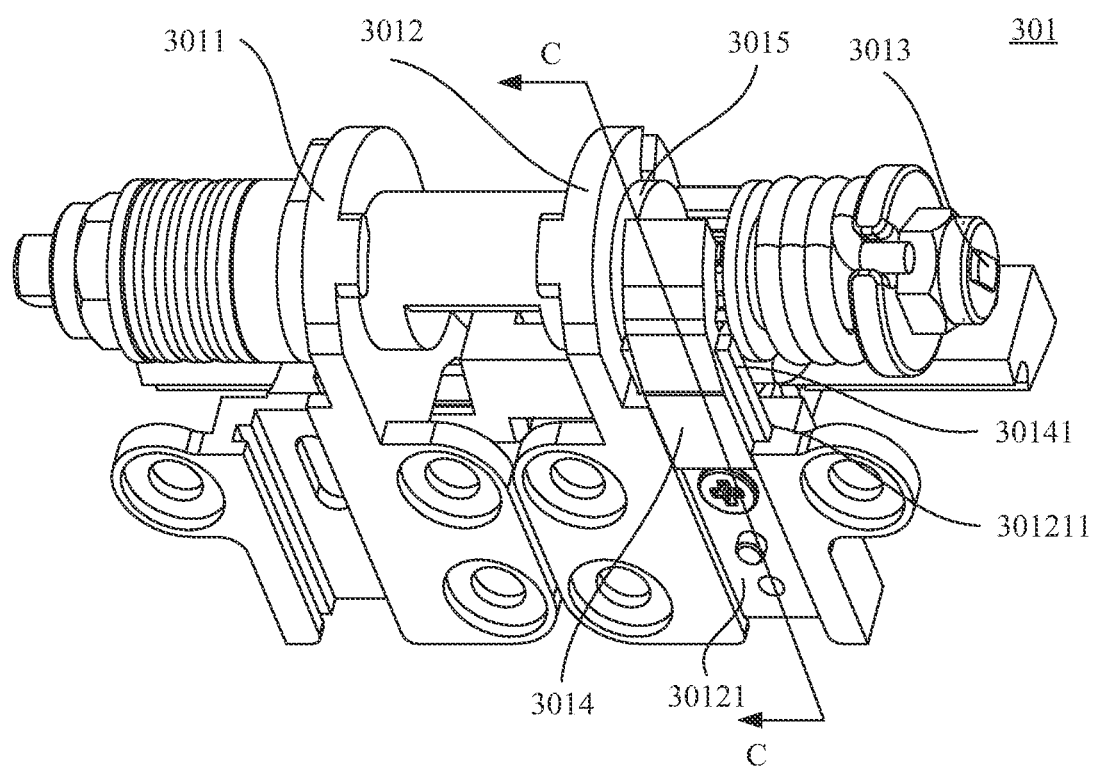
FIG. 18 is a schematic diagram of a structure of the rotating assembly shown in FIG. 17 from another angle.

In addition, FIG. 18 is a schematic diagram of a structure of the rotating assembly 301 shown in FIG. 17 from another angle. The rotating assembly 301 is also provided with a connecting rod 3014, and the connecting rod 3014 can slide along the second fastening piece 3012. However, different from the foregoing embodiment, the main shaft 3013 in this embodiment drives the connecting rod 3014 to slide along the second fastening piece 3012 in a different manner. First, refer to FIG. 18. During specific implementation, the second fastening piece 3012 is provided with a guide rail 30121, and the connecting rod 3014 may be accommodated on the guide rail 30121 and may slide along the guide rail 30121. In addition, to prevent the connecting rod 3014 from falling from the guide rail 30121, a first limiting part 301211 may be disposed on a side wall of the guide rail 30121, a second limiting part 30142 may be disposed on the connecting rod 3014, and the second limiting part 30142 may be clamped to the first limiting part 301211 and can slide in the first limiting part 301211. The first limiting part 301211 may be a chute, the second limiting part 30142 may be a protrusion, and the protrusion may be clamped to the chute. It may be understood that, in some other embodiments of this application, the first limiting part 301211 may alternatively be a protrusion, and the second limiting part 30142 may be a groove. In this way, cooperation of the first limiting part 301211 and the second limiting part may provide a guiding function for sliding of the connecting rod 3014 along the guide rail 30121, thereby improving reliability of movement of the connecting rod 3014.

Refer to FIG. 18. When the rotating assembly 301 moves, to implement sliding of the connecting rod 3014 in the guide rail 30121, the rotating assembly 301 may be further provided with a pendulum rod structure 3015, and the pendulum rod structure 3015 may be disposed on a side that is of the second fastening piece 3012 and that is away from the first fastening piece 3011. The pendulum rod structure 3015 may be sleeved on the main shaft 3013. In addition, in a radial direction of the main shaft 3013, the pendulum rod structure 3015 is fixedly connected to the main shaft 3013, so that the pendulum rod structure 3015 can rotate synchronously with the main shaft 3013.

Figure 19A:
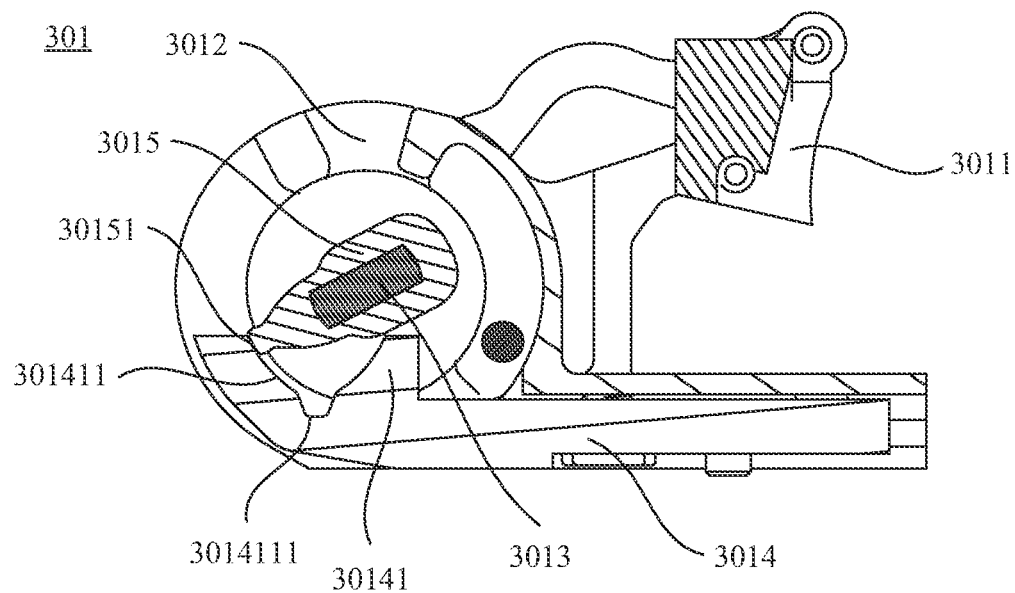
FIG. 19a is a sectional view of the rotating assembly shown in FIG. 18 at C-C.

FIG. 19a is a sectional view of the rotating assembly 301 shown in FIG. 18 at C-C. The connecting rod 3014 has a connecting part 30141, and the connecting part 30141 may be provided with a track groove 301411. In addition, the pendulum rod structure 3015 has a protruding part 30151, and the protruding part 30151 can be inserted into the track groove 301411 and can be in contact with a groove wall of the track groove 301411. In this way, when the main shaft 3013 rotates, the pendulum rod structure 3015 may be driven to rotate synchronously, so that the protruding part 30151 of the pendulum rod structure 3015 slides along the groove wall of the track groove 301411.

Figure 19B:
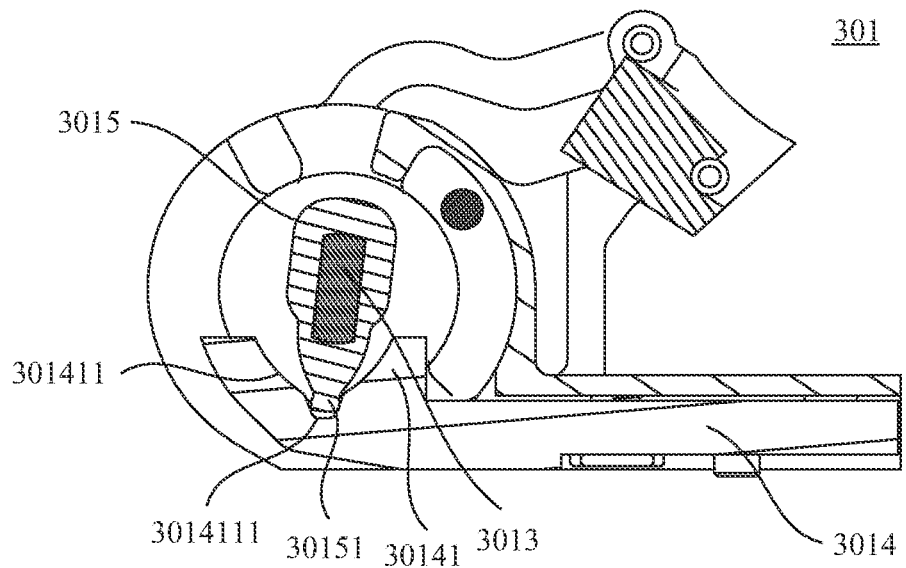
FIG. 19b and FIG. 19c are sectional views of a rotating assembly according to another embodiment of this application in different working states.
Figure 19C:
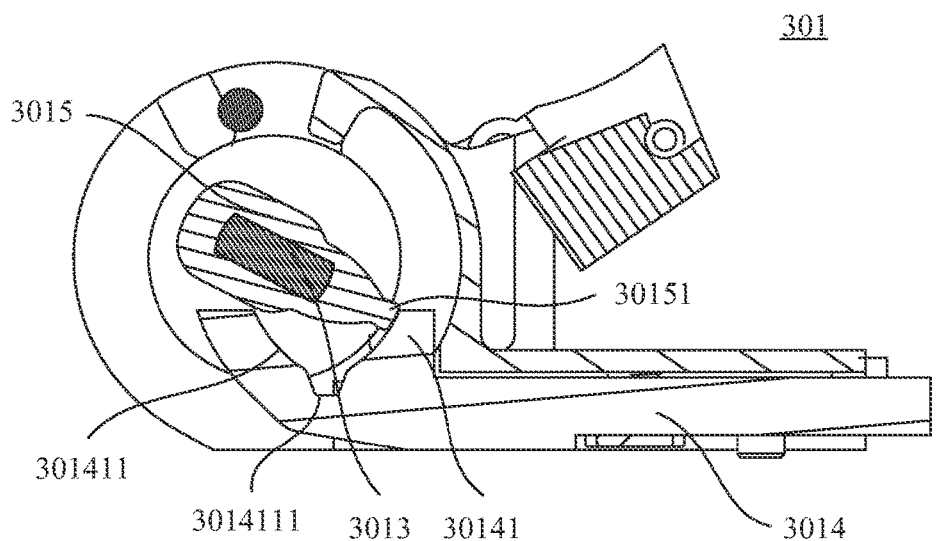

It may be understood that a movement track of the connecting rod 3014 may be designed by properly designing the track groove 301411. For example, when the rotating assembly 301 is in a first working state shown in FIG. 19a, the protruding part 30151 of the pendulum rod structure 3015 abuts against a groove wall that is of the track groove 301411 and that is away from the keyboard body, so that the connecting rod 3014 can be hidden in the second fastening piece 3012. In addition, FIG. 19b shows a relative location of the protruding part 30151 of the connecting rod 3014 in the track groove 301411 when the rotating assembly 301 is in an intermediate state from the first working state to a second working state. It may be seen from FIG. 19b, in the intermediate state, the track groove 301411 may be provided with a concave part 3014111, and the protruding part 30151 may extend into the concave part 3014111. When the rotating assembly 301 changes from the intermediate state shown in FIG. 19b to the second working state, the protruding part 30151 may press a side wall of the concave part 3014111, to push the connecting rod 3014 to slide in a direction toward the keyboard body. FIG. 19c shows a relative location of the protruding part 30151 of the connecting rod 3014 in the track groove 301411 when the rotating assembly 301 is in an unfolded state. When the rotating assembly 301 is in the unfolded state shown in FIG. 19c, the connecting rod 3014 may extend from the second fastening piece 3012 in a direction toward the keyboard body 201. For example, when the rotating assembly 301 is used in the keyboard assembly 2, and the electronic device in which the keyboard assembly 2 is used changes from a closed state to an unfolded state, the connecting rod 3014 may slide in the direction toward the keyboard body 201. On the contrary, when the electronic device changes from the unfolded state to the closed state, the connecting rod 3014 may slide in the guide rail 30121 in a direction away from the keyboard body 201.

In this embodiment of this application, the rotating shaft connecting piece 2014 of the keyboard body 201 may still be fixedly connected to the connecting rod 3014, so that when the connecting rod 3014 slides in the direction toward or away from the keyboard body 201, the rotating shaft connecting piece 2014 is driven to move in a direction toward or away from the rotating shaft mechanism 3. In this way, the crossbar 20153 moves in an arrangement direction of each row of keys 2011, and the keys 2011 move in a direction toward or away from corresponding key slots 20121.

In this application, the main shaft 3013 of the rotating shaft mechanism 3 rotates to drive the connecting rod 3014 to slide in the direction toward or away from the keyboard body 201, and the rotating shaft connecting piece 2014 is fixedly connected to the connecting rod 3014, so that sliding of the connecting rod 3014 drives the rotating shaft connecting piece 2014 to move in the direction toward or away from the rotating shaft mechanism 3, and the crossbar 20153 moves in the arrangement direction of each row of keys 2011. In this way, an abutting structure between the crossbar 20153 and the corresponding keys 2011 may be used to implement movement of the keys 2011 in a direction toward key slots 20121 or in a direction of exposing the key slots 20121. Therefore, the keys 2011 may protrude from the surface of the keyboard cover plate 2012 when the keys 2011 are in a use state, to facilitate a tapping operation by a user. In addition, when the keyboard assembly 2 is not used to perform an input operation, the keys 2011 may move in a direction toward the corresponding key slots 20121, to reduce a height that is of each of the keys 2011 and that protrudes from the surface of the keyboard cover plate 2012. In addition, the keys 2011 can be even completely hidden in the corresponding key slots 20121. When the keyboard assembly is used in the electronic device, the keys 2011 move in the direction toward the corresponding key slots 20121, to reduce space that is in a thickness direction of the entire electronic device and that is occupied by the keys 2011. Therefore, the electronic device can be designed to be thinner in this state.

It may be understood that the description of the rotating shaft mechanism 3 in the foregoing embodiments is merely an example of description provided in a possible embodiment of this application. In another possible embodiment of this application, only one fastening piece may be disposed in the rotating shaft mechanism 3. In this case, the main shaft 3013 may be rotatably connected to the fastening piece. In some other possible embodiments of this application, the main shaft 3013 of the rotating shaft mechanism 3 may alternatively be disposed independently of the first fastening piece 3011 and the second fastening piece 3012 in the foregoing embodiments, provided that the main shaft 3013 can rotate and the connecting rod 3014 can be driven to move in a direction toward or away from the rotating shaft mechanism 3 during rotation of the main shaft 3013.

In addition, the rotating shaft mechanism 3 may alternatively be disposed in any other possible manner, provided that when the rotating shaft mechanism 3 moves, the rotating shaft connecting piece 2014 of the keyboard assembly 2 can be driven to move in the direction toward or away from the rotating shaft mechanism. The other possible manners of the rotating shaft mechanism 3 are not described one by one herein, but it should be understood that the other possible manners fall within the protection scope of this application.

In this application, in addition to the disposing manner provided in the foregoing embodiment, the keyboard body 201 may further be disposed in another possible manner, provided that at least a part of the first frame can be driven to move in the arrangement direction of the plurality of rows of keys, and each crossbar moves in the arrangement direction of each row of keys. In this way, the crossbar can be driven to move along the X axis by driving at least the part of the first frame to move along the Y axis. Therefore, the keys can be lifted and lowered.

Figure 20:
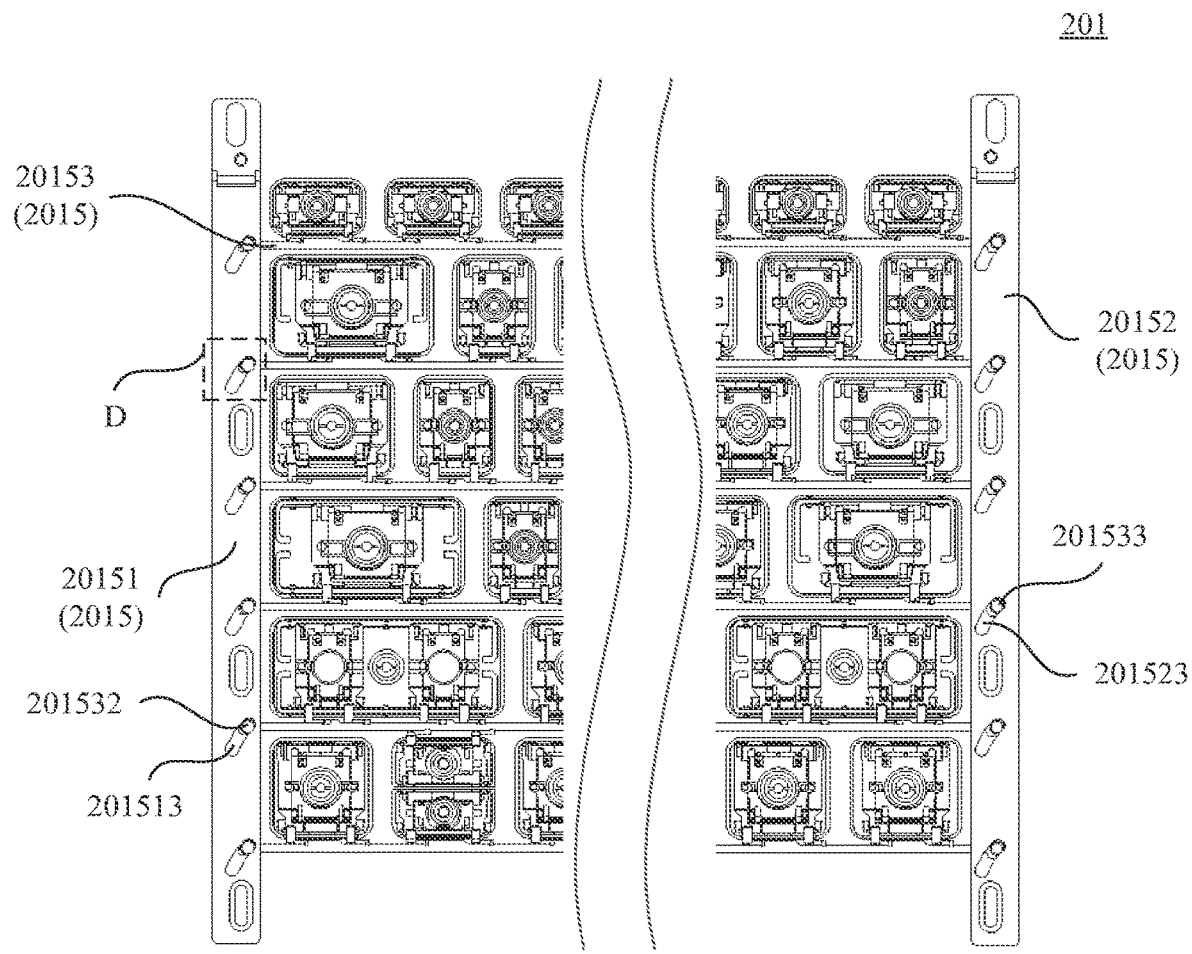
FIG. 20 is a schematic diagram of a structure of a keyboard body according to another embodiment of this application.

For example, FIG. 20 is a schematic diagram of a structure of the keyboard body 201 according to another possible embodiment of this application. In this embodiment, the keyboard body 201 may also include the frame assembly 2015 and the key (not shown in FIG. 20), and the key may be disposed with reference to any one of the foregoing embodiments. Details are not described herein again. However, a disposing manner of the frame assembly 2015 is slightly different from that in the foregoing embodiments. Specifically, the frame assembly 2015 may include the first frame 20151 and the crossbar 20153. The first frame 20151 may be provided with a first guide trough 201513, the crossbar 20153 may be provided with a first pin head 201532, and the first pin head 201532 may be inserted into the first guide trough 201513. When the first frame 20151 moves in the arrangement direction of the plurality of rows of keys, the crossbar 20153 is driven to move in the arrangement direction of each row of keys, and the first pin head 201532 may slide along the first guide trough 201513.

Figure 21:
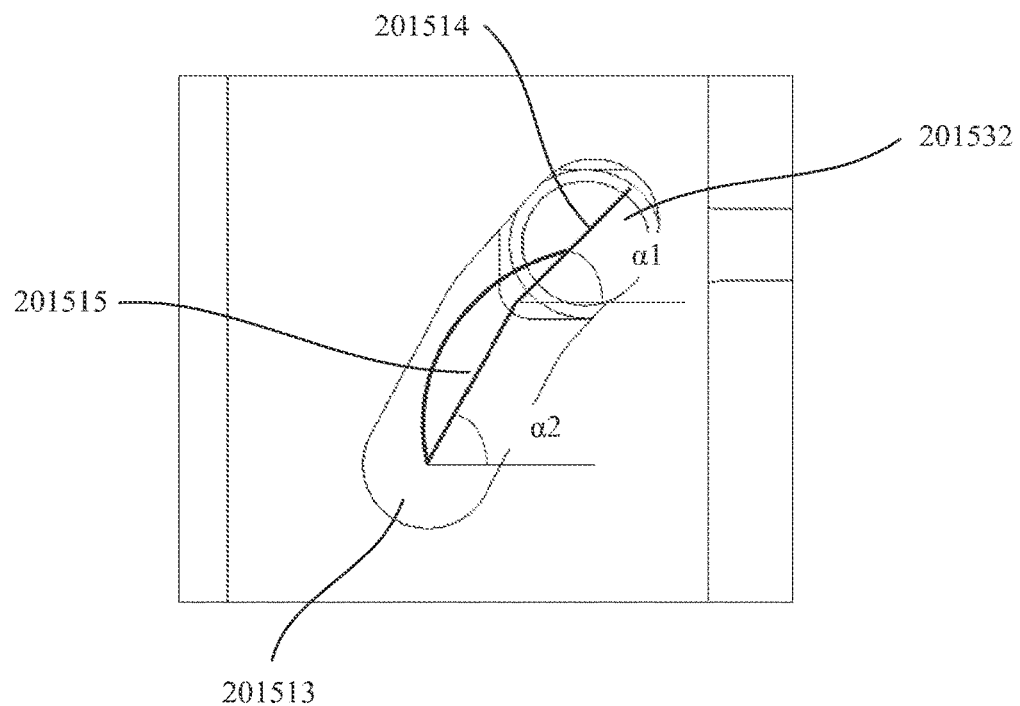
FIG. 21 is an enlarged view of a partial structure at D in FIG. 20.

When the first guide trough 201513 is disposed, supporting force of the lifting mechanism on key caps changes when the keys move in a direction toward the key slots. Based on this, a shape of the first guide trough 201513 may be obtained by fitting based on a force status of the keys in the foregoing process. For example, FIG. 21 is an enlarged view of a partial structure at D in FIG. 20. In FIG. 21, the first guide trough 201513 is designed in an arc shape. In addition, in this embodiment of this application, when the key moves in a direction toward the key slot, a movement track of the first pin head 201532 in the first guide trough 201513 may be divided into a first track segment 201514 and a second track segment 201515 that are continuous. An included angle α1 between the first track segment 201514 and an extension direction of the crossbar 20153 is smaller than an included angle α2 between the second track segment 201515 and the extension direction of the crossbar 20153. In this way, when the first pin head 201532 moves along the first track segment 201514 and the second track segment 201515, a movement speed of a key cap in the first track segment 201514 is increased, and a movement speed of the key cap in the second track segment 201515 is slowed down, so that driving force required by the key when the key moves along the two track segments is close. Therefore, force received by the key in an entire process of being pressed is more uniform.

In addition, it may be understood that, because driving force required by the key when the key moves along the first track segment 201514 is increased, and driving force required by the key when the key moves along the second track segment 201515 is decreased, driving force required by the key in the entire process of being pressed is decreased. This helps improve use experience of a user.

It should be noted that in this application, in addition to the arc-shaped design shown in FIG. 21, the first guide trough 201513 may be further designed in a fold-line shape, a parabola shape, or another possible shape in some possible embodiments. This is not specifically limited in this application, provided that a sliding track of the first pin head 201532 in the first guide trough 201513 meets the foregoing requirement.

Still refer to FIG. 20. In this embodiment of this application, the keyboard body 201 may further include a second frame 20152, the first frame 20151 and the second frame 20152 are disposed opposite to each other, a plurality of rows of keys are located between the first frame 20151 and the second frame 20152, and each row of keys are arranged in a direction from the first frame 20151 to the second frame 20152. In addition, the second frame 20152 may be disposed with reference to the first frame 20151. Simply put, the second frame 20152 may include a second guide trough 201523, the crossbar 20153 may further be disposed with a second pin head 201533, and the second pin head 201533 is inserted into the second guide trough 201523. The first frame 20151 and the second frame 20152 may move synchronously in a same direction, and when the first frame 20151 and the second frame 20152 move in the arrangement direction of the plurality of rows of keys, the crossbar 20153 may be driven to move in the arrangement direction of each row of keys. In this case, the second pin head 201533 can slide along the second guide trough 201523.

The second guide trough 201523 may also be designed in an arc shape, a fold line shape, a parabola shape, or the like. In addition, when the keys move in a direction toward the key slots, a movement track of the second pin head 201533 in the second guide trough 201523 is divided into a third track segment and a fourth track segment that are continuous. An included angle α3 between the third track segment and the extension direction of the crossbar 20153 is smaller than an included angle α4 between the fourth track segment and the extension direction of the crossbar 20153.

In this application, synchronous movement of the first frame 20151 and the second frame 20152 drives the crossbar 20153 to move, so that stability of movement of the crossbar 20153 can be effectively improved. This helps improve consistency of movement of an entire row of keys that are correspondingly disposed for the crossbar 20153, and improves user experience.

Figure 22:
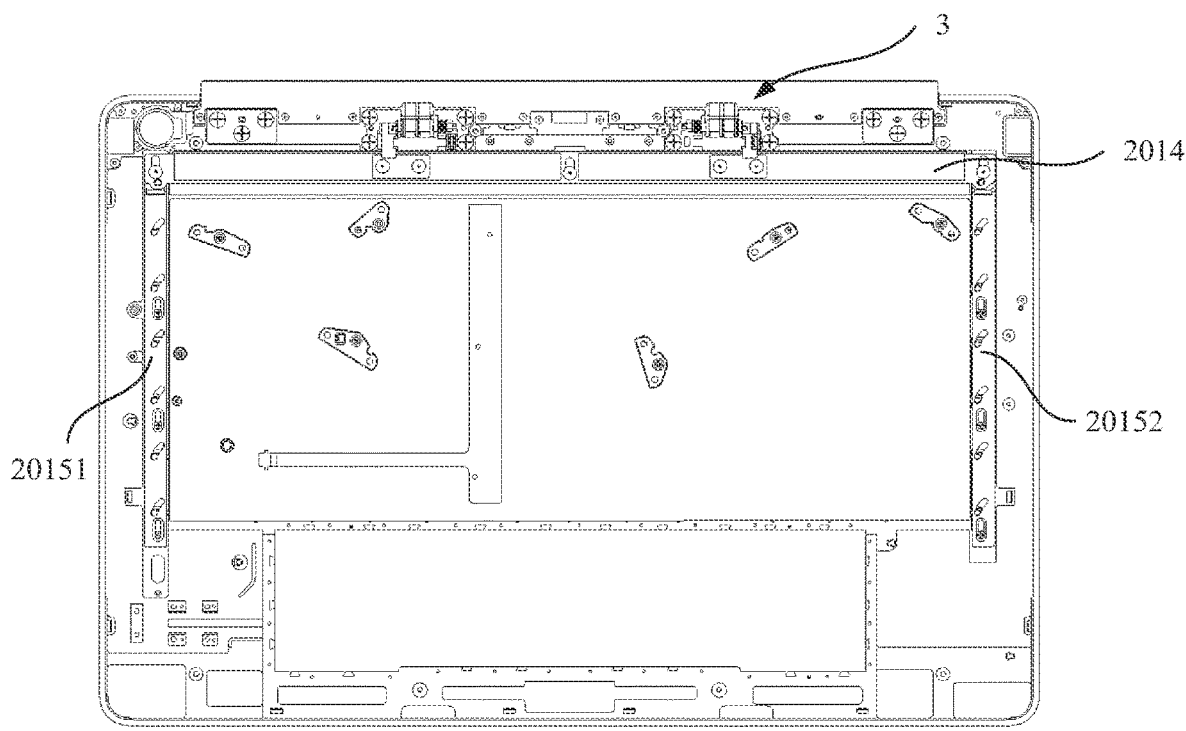
FIG. 22 is a schematic diagram of a structure of a keyboard body according to another embodiment of this application.

In the embodiment shown in FIG. 20, the rotating shaft mechanism of the keyboard assembly may also be used as a drive mechanism, to drive the first frame 20151 and the second frame 20152 to move in the arrangement direction of the plurality of rows of keys. Specifically, refer to FIG. 22. FIG. 22 shows a connection relationship between the rotating shaft mechanism 3 and the first frame 20151 and the second frame 20152. The keyboard body 201 may further include a rotating shaft connecting piece 2014, the rotating shaft connecting piece 2014 is connected to the rotating shaft mechanism 3, and movement of the rotating shaft mechanism 3 may drive the rotating shaft connecting piece 2014 to move in a direction toward or away from the rotating shaft mechanism 3, that is, move in the arrangement direction of the plurality of rows of keys. In addition, the first frame 20151 and the second frame 20152 are fixedly connected to the rotating shaft connecting piece 2014. In this way, the first frame 20151 and the second frame 20152 may move, along with the rotating shaft connecting piece 2014, in the direction toward or away from the rotating shaft mechanism 3, to drive the crossbar 20153 to move in the arrangement direction of each row of keys.

It should be noted that, the rotating shaft mechanism 3 in the embodiment shown in FIG. 22 may be disposed with reference to the rotating shaft mechanism 3 provided in any one of the foregoing embodiments. Details are not described herein again.

Figure 23:
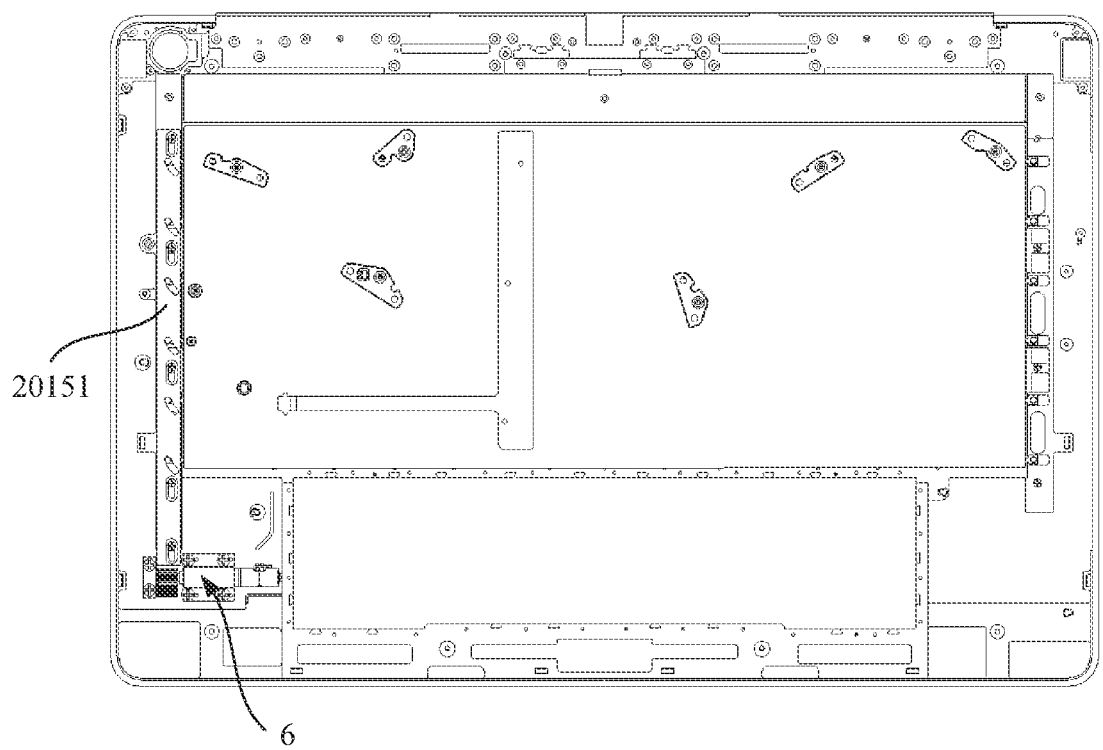
FIG. 23 is a schematic diagram of a structure of a keyboard body according to another embodiment of this application.

FIG. 23 is a schematic diagram of a structure of the keyboard body 201 according to another possible embodiment of this application. In this embodiment, the frame assembly 2015 of the keyboard body 201 is not provided with the second frame 20152, and the crossbar 20153 may be driven to move in the arrangement direction of each row of keys only by movement of the first frame 20151 in the arrangement direction of the plurality of rows of keys. In addition, the first frame 20151 in the embodiment shown in FIG. 23 may be disposed with reference to the first frame 20151 in the embodiment shown in FIG. 20. Details are not described herein again.

In this application, in addition to using the rotating shaft mechanism 3 as the drive mechanism for moving the frame assembly 2015, another possible drive mechanism may be used to drive the frame assembly 2015 to move. Refer to FIG. 23. For example, in this embodiment, the drive mechanism may be an electric drive mechanism 6, the electric drive mechanism 6 may be disposed on the keyboard body 201, and the electric drive mechanism 6 may be connected to the first frame 20151, to drive the first frame 20151 to move in the arrangement direction of the plurality of rows of keys. In this application, a type of the electric drive mechanism 6 is not limited. For example, the electric drive mechanism 6 may be a motor, an electromagnet, or the like. Alternatively, the electric drive mechanism 6 may be connected to the first frame 20151 through a memory metal wire, to drive the first frame 20151 to move by heating and shrinking the memory metal wire.

It may be understood that disposing the drive mechanism as the electric drive mechanism 6 may prevent movement of the frame assembly 2015 from being affected by disposing of the rotating shaft mechanism 3, thereby helping simplify a structure of the keyboard assembly. In addition, when the electric drive mechanism 6 is used as the drive mechanism for moving the frame assembly 2015, a control program of the electric drive mechanism 6 may be adjusted to control a movement parameter (a displacement, a direction, a speed, and the like) of the frame assembly 2015. This helps enhance a technical sense of a design of the keyboard assembly, and further enhances user experience.

It should be noted that, when the frame assembly 2015 includes both the first frame 20151 and the second frame 20152, both the first frame 20151 and the second frame 20152 may be driven to move under action of the electric drive mechanism 6. The first frame 20151 and the second frame 20152 may share an electric drive mechanism 6. This can improve consistency of movement of the first frame 20151 and the second frame 20152. Alternatively, an electric drive mechanism 6 may be separately disposed for the first frame 20151 and the second frame 20152, and control programs of the two electric drive mechanisms 6 are adjusted to implement synchronous movement of the first frame 20151 and the second frame 20152.

Based on this, in this application, when the frame assembly 2015 uses a structure shown in FIG. 6, the electric drive mechanism 6 may also be used to drive the first frame 20151 and the second frame 20152 to move. When the frame assembly 2015 is disposed, a connection between the first frame 20151 and the second frame 20152 and the rotating shaft mechanism 3 may be replaced with a connection between the first frame 20151 and the second frame 20152 and the electric drive mechanism 6. This is not described in detail herein.

It is clearly that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A keyboard assembly, comprising a keyboard body and a drive mechanism,
wherein the keyboard body comprises:
keys that are accommodated in key slots on the keyboard body and arranged in a plurality of rows in parallel, with each row of keys comprising a plurality of keys; and
a frame assembly that comprises a first frame and a plurality of crossbars, wherein each row of keys are disposed for at least one of the plurality of crossbars;
wherein the drive mechanism drives at least part of the first frame to move in an arrangement direction of the plurality of rows of keys; each crossbar moves, along with movement of the at least part of the first frame in the arrangement direction of the plurality of rows of keys, in an arrangement direction of each row of keys; and each row of keys move, along with movement of each crossbar, in a direction toward the key slots or in a direction of exposing the key slots;
wherein the first frame comprises:
a first outer frame connected to the drive mechanism, and
a first inner frame located on a side that is of the first outer frame and that faces the keys;
wherein a first connecting rod assembly is disposed between the first inner frame and the first outer frame; the first connecting rod assembly comprises a first connecting rod and a second connecting rod, one end of the first connecting rod is hinged to the first inner frame, the other end of the first connecting rod is hinged to the first outer frame, one end of the second connecting rod is hinged to a rod body of the first connecting rod, and the other end of the second connecting rod is hinged to a fixed mechanical part on the keyboard body; and
wherein the first outer frame moves, along with the drive mechanism, in the arrangement direction of the plurality of rows of keys, to drive the first inner frame to move in a direction close to or away from the first outer frame; and one end of each crossbar is fixedly connected to the first inner frame, and each crossbar moves, along with movement of the first inner frame, in the arrangement direction of each row of keys.

2. The keyboard assembly of claim 1, wherein the keyboard assembly further comprises a second frame, the first frame and the second frame are disposed opposite to each other, and the drive mechanism drives the second frame to move in the arrangement direction of the plurality of rows of keys; and the plurality of rows of keys are located between the first frame and the second frame, and each row of keys are arranged in a direction from the first frame to the second frame.

3. The keyboard assembly of claim 2, wherein the second frame comprises:

a second outer frame connected to the drive mechanism, and a second inner frame located on a side that is of the second outer frame and that faces the keys, with the second inner frame being fixedly connected to the other end of each crossbar;

wherein a second connecting rod assembly is disposed between the second inner frame and the second outer frame, the second connecting rod assembly comprises a third connecting rod and a fourth connecting rod, one end of the third connecting rod is hinged to the second inner frame, the other end of the third connecting rod is hinged to the second outer frame, one end of the fourth connecting rod is hinged to a rod body of the third connecting rod, and the other end of the fourth connecting rod is hinged to a fixed mechanical part on the keyboard body; and wherein the first outer frame and the second outer frame move, along with the drive mechanism, in the arrangement direction of the plurality of rows of keys, to drive the first inner frame and the second inner frame to move in a direction that is the same as the arrangement direction of each row of keys.

4. The keyboard assembly of claim 1, wherein the first frame is provided with a first guide trough for insertion of a first pin head of a first crossbar of the plurality of crossbars; wherein when the first frame moves in the arrangement direction of the plurality of rows of keys, the first pin head slides along the first guide trough, to drive the first crossbar to move in the arrangement direction of each row of keys.

5. The keyboard assembly of claim 4, wherein in a process in which the keys move in the direction toward the key slots, a movement track of the first pin head along the first guide trough is divided into a first track segment and a second track segment that are continuous; and an included angle between the first track segment and an extension direction of the first crossbar is smaller than an included angle between the second track segment and the extension direction of the first crossbar.

6. The keyboard assembly of claim 4, wherein the keyboard assembly further comprises a second frame, the first frame and the second frame are disposed opposite to each other, wherein the drive mechanism drives the second frame to move in the arrangement direction of the plurality of rows of keys; and the plurality of rows of keys are located between the first frame and the second frame, and each row of keys are arranged in a direction from the first frame to the second frame.

7. The keyboard assembly of claim 6, wherein the second frame is provided with a second guide trough for insertion of a second pin head of the first crossbar;

wherein when the second frame moves in the arrangement direction of the plurality of rows of keys, the second pin head slides along the second guide trough, to drive the first crossbar to move in the arrangement direction of each row of keys.

8. The keyboard assembly of claim 7, wherein in the process in which the keys move in the direction toward the key slots, a movement track of the second pin head along the second guide trough is divided into a third track segment and a fourth track segment that are continuous; and an included angle between the third track segment and the extension direction of the first crossbar is smaller than an included angle between the fourth track segment and the extension direction of the first crossbar.

9. The keyboard assembly of claim 1, wherein the keyboard assembly comprises:

a rotating shaft mechanism used as the drive mechanism, and a rotating shaft connecting piece connected to the rotating shaft mechanism;

wherein the rotating shaft mechanism moves to drive the rotating shaft connecting piece to move in a direction toward or away from the rotating shaft mechanism; and the first frame moves, along with the rotating shaft connecting piece, in the direction toward or away from the rotating shaft mechanism, to drive the crossbar to move in the arrangement direction of each row of keys.

10. The keyboard assembly of claim 9, wherein the rotating shaft mechanism comprises a rotating assembly, the rotating assembly comprises a main shaft and a connecting rod, the rotating shaft connecting piece is fixedly connected to the connecting rod;

wherein the connecting rod slides, along with rotation of the main shaft, in a direction close to or away from the keyboard body.

11. The keyboard assembly of claim 10, wherein the rotating assembly further comprises a fastening piece, wherein the main shaft is rotatably connected to the fastening piece, and the connecting rod is slidably connected to the fastening piece;

wherein the main shaft is further provided with a stopper part, a track groove is disposed on an end face that is of the stopper part and that faces the connecting rod, the connecting rod has a connecting part inserted into the track groove, wherein the main shaft rotates to drive the connecting part to slide in the track groove, to push the connecting rod to slide in the direction close to or away from the keyboard body.

12. The keyboard assembly of claim 10, wherein the rotating assembly further comprises a pendulum rod structure sleeved on the main shaft, the pendulum rod structure is fixedly connected to the main shaft in a radial direction of the main shaft and is provided with a protruding part;

wherein the connecting rod has a connecting part having a track groove, the track groove is provided with a concave part;

wherein the pendulum rod structure rotates, along with the main shaft, to drive the protruding part to slide along the track groove, and push the connecting rod to slide in the track groove in the direction close to or away from the keyboard body when the protruding part extends into the concave part.

13. The keyboard assembly of claim 1, wherein for a first row of keys and a corresponding crossbar that are correspondingly disposed, each key of the first row of keys comprises a key cap and a lifting mechanism, the lifting mechanism is located in the key slot, and the key cap covers the lifting mechanism;

wherein the corresponding crossbar is provided with a first abutting structure, the lifting mechanism is provided with a second abutting structure, and the corresponding crossbar moves to drive the first abutting structure to press the second abutting structure, so that the lifting mechanism drives the key cap to move in the direction toward the key slot.

14. The keyboard assembly of claim 13, wherein the keyboard body is provided with a plurality of key slots, the crossbar is provided with a plurality of first abutting structures, and at least one first abutting structure is accommodated in each of the key slots.

15. The keyboard assembly of claim 13, wherein the first abutting structure has a first inclined surface, the second abutting structure has a second inclined surface, and the first inclined surface is disposed opposite to the second inclined surface.

16. The keyboard assembly of claim 1, wherein the keyboard body further comprises a bottom plate and a keyboard cover plate, the keyboard cover plate covers the bottom plate, and accommodation space is formed between the bottom plate and the keyboard cover plate;

and the key slots are arranged on the keyboard cover plate.

17. The keyboard assembly of claim 1, wherein the keyboard body further comprises a bottom plate, the bottom plate is provided with a plurality of chutes, and each crossbar moves along a corresponding chute.

18. An electronic device, comprising a display screen and a keyboard assembly, wherein the display screen is rotatably connected to the keyboard body through a rotating shaft mechanism, and wherein the keyboard assembly comprises a keyboard body and a drive mechanism, and the keyboard body comprises keys and a frame assembly, wherein the keys are accommodated in key slots on the keyboard body and arranged in a plurality of rows in parallel, each row of keys comprise a plurality of keys; and the frame assembly comprises a first frame and a plurality of crossbars, each row of keys are disposed for at least one of the plurality of crossbars;

wherein the drive mechanism drives at least part of the first frame to move in an arrangement direction of the plurality of rows of keys; each crossbar moves, along with movement of the at least part of the first frame in the arrangement direction of the plurality of rows of keys, in an arrangement direction of each row of keys; and each row of keys move, along with movement of each crossbar, in a direction toward the key slots or in a direction of exposing the key slots;

wherein the first frame comprises:

a first outer frame connected to the drive mechanism, and a first inner frame located on a side that is of the first outer frame and that faces the keys;

wherein a first connecting rod assembly is disposed between the first inner frame and the first outer frame; the first connecting rod assembly comprises a first connecting rod and a second connecting rod, one end of the first connecting rod is hinged to the first inner frame, the other end of the first connecting rod is hinged to the first outer frame, one end of the second connecting rod is hinged to a rod body of the first connecting rod, and the other end of the second connecting rod is hinged to a fixed mechanical part on the keyboard body; and wherein the first outer frame moves, along with the drive mechanism, in the arrangement direction of the plurality of rows of keys, to drive the first inner frame to move in a direction close to or away from the first outer frame; and one end of each crossbar is fixedly connected to the first inner frame, and each crossbar moves, along with movement of the first inner frame, in the arrangement direction of each row of keys.

19. An electronic device, comprising a host and a keyboard assembly, wherein the host is rotatably connected to the keyboard assembly through a rotating shaft mechanism, and wherein the keyboard assembly comprises a keyboard body and a drive mechanism, and the keyboard body comprises keys and a frame assembly, wherein the keys are accommodated in key slots on the keyboard body and arranged in a plurality of rows in parallel, each row of keys comprise a plurality of keys; and the frame assembly comprises a first frame and a plurality of crossbars, and each row of keys are disposed for at least one of the plurality of crossbars;

wherein the drive mechanism drives at least part of the first frame to move in an arrangement direction of the plurality of rows of keys; each crossbar moves, along with movement of the at least part of the first frame in the arrangement direction of the plurality of rows of keys, in an arrangement direction of each row of keys; and each row of keys move, along with movement of each crossbar, in a direction toward the key slots or in a direction of exposing the key slots; and wherein the electronic device further comprises a first support plate, the host is detachably connected to the first support plate, and the first support plate is rotatably connected to the keyboard body through the rotating shaft mechanism;

wherein the first frame comprises:

a first outer frame connected to the drive mechanism, and a first inner frame located on a side that is of the first outer frame and that faces the keys;

wherein a first connecting rod assembly is disposed between the first inner frame and the first outer frame; the first connecting rod assembly comprises a first connecting rod and a second connecting rod, one end of the first connecting rod is hinged to the first inner frame, the other end of the first connecting rod is hinged to the first outer frame, one end of the second connecting rod is hinged to a rod body of the first connecting rod, and the other end of the second connecting rod is hinged to a fixed mechanical part on the keyboard body; and wherein the first outer frame moves, along with the drive mechanism, in the arrangement direction of the plurality of rows of keys, to drive the first inner frame to move in a direction close to or away from the first outer frame; and one end of each crossbar is fixedly connected to the first inner frame, and each crossbar moves, along with movement of the first inner frame, in the arrangement direction of each row of keys.

* * * * *